US008098037B2

(12) United States Patent
Sugiura

(10) Patent No.: US 8,098,037 B2
(45) Date of Patent: Jan. 17, 2012

(54) VEHICLE DOOR OPENING-CLOSING APPARATUS

(75) Inventor: Takehiko Sugiura, Kariya (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 547 days.

(21) Appl. No.: 12/266,605

(22) Filed: Nov. 7, 2008

(65) Prior Publication Data

US 2009/0120001 A1 May 14, 2009

(30) Foreign Application Priority Data

Nov. 8, 2007 (JP) ................................ 2007-290502
Mar. 13, 2008 (JP) ................................ 2008-064622
Mar. 13, 2008 (JP) ................................ 2008-064623

(51) Int. Cl.
*G05B 5/00* (2006.01)

(52) U.S. Cl. ........ 318/451; 318/449; 318/445; 318/469; 318/266; 318/286

(58) Field of Classification Search .................. 318/451, 318/449, 445, 469, 266, 286, 434
See application file for complete search history.

(56) References Cited

U.S. PATENT DOCUMENTS 7,319,390 B2 * 1/2008 Takasuka et al. ............ 340/541
7,352,869 B2 * 4/2008 Inoue et al. ............... 381/71.11
7,712,777 B2 * 5/2010 Breed .......................... 280/735
2006/0232378 A1 10/2006 Ogino et al.

FOREIGN PATENT DOCUMENTS

JP 2002-295064 A 10/2002
JP 2005-98016 A 4/2005

* cited by examiner

*Primary Examiner* — Walter Benson
*Assistant Examiner* — David Luo
(74) *Attorney, Agent, or Firm* — Buchanan Ingersoll & Rooney PC

(57) ABSTRACT

A vehicle door opening-closing apparatus is provided, which includes a vibration detector and a controller. The controller acquires an envelope formed by connecting crests or troughs of a waveform of vibration detected by the vibration detection sensor. The controller determines whether or not a shape of the envelope meets a condition. A vehicle door is controlled based on a result of determination by the controller.

19 Claims, 19 Drawing Sheets

(FIG.11 CONTINUED)
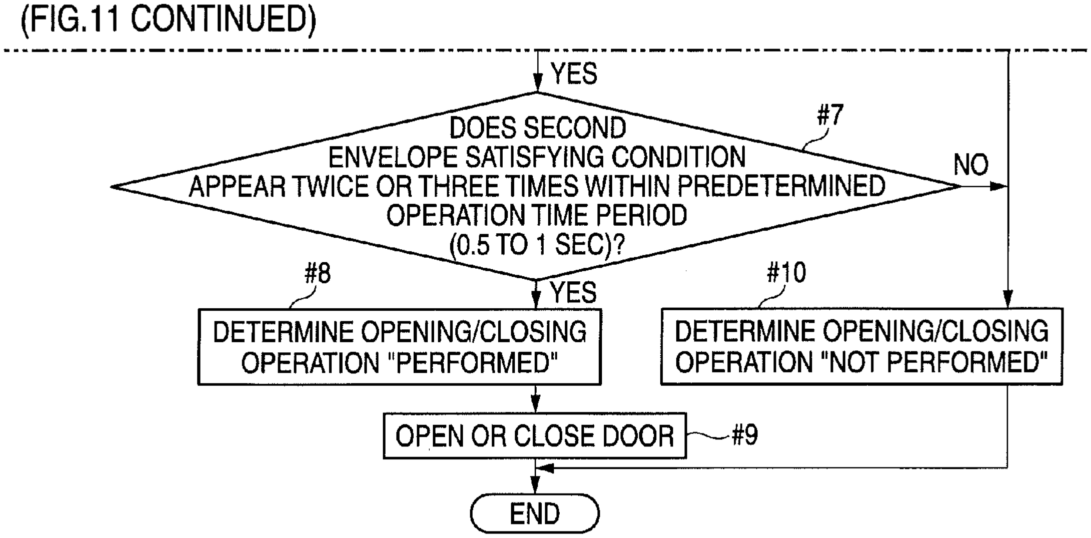

(FIG.14 CONTINUED)
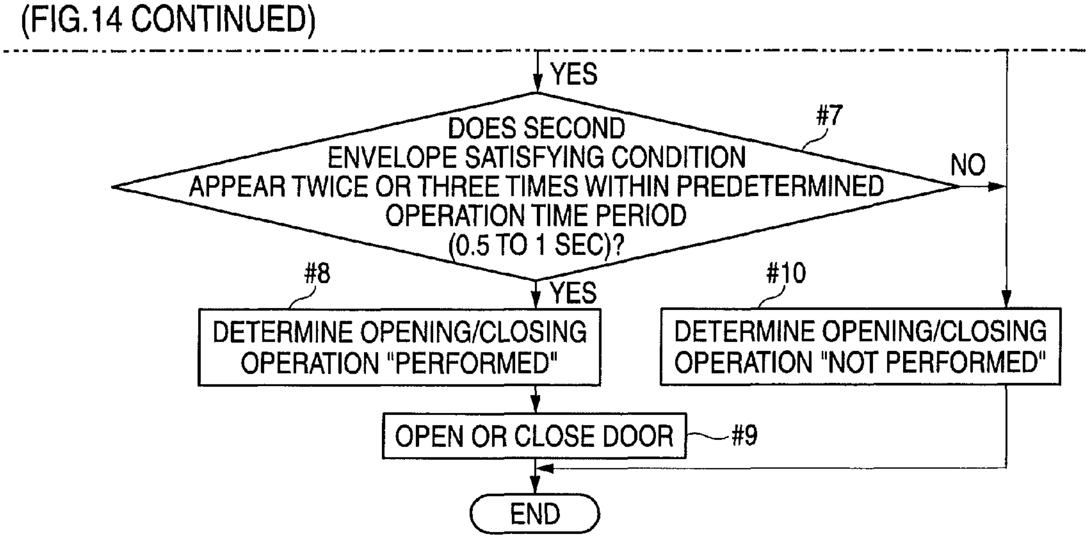

VEHICLE DOOR OPENING-CLOSING APPARATUS

CROSS REFERENCE TO RELATED APPLICATION

The present disclosure relates to the subject matter contained in Japanese patent application Nos. 2007-290572 filed on Nov. 8, 2007 and 2008-064622 and 2008-064623 both filed on Mar. 13, 2008, each of which is expressly incorporated herein by reference in its entirety.

TECHNICAL FIELD

This invention relates to a vehicle door opening-closing apparatus for determining whether or not the user performs opening or closing operation for a vehicle door and opening or closing the vehicle door accordingly.

BACKGROUND ARTS

Known as an example of such a vehicle door opening-closing apparatus is a vehicle door opening-closing apparatus operating in cooperation with a locking system (smart entry system) for automatically controlling unlocking and locking of a vehicle door. The smart entry system detects the user approaching the vehicle or getting off by communicating with a mobile device carried by the user, recognizes a user's unlocking or locking command for the vehicle door, and controls locking or unlocking the vehicle door. Japanese Patent Laid Open No. 2002-295064 discloses a vehicle door opening-closing apparatus in such a smart entry system. In the vehicle door opening-closing apparatus, a detection electrode is provided for a door handle for which the user performs vehicle door opening or closing operation (refer to paragraphs 2 to 9). The vehicle door opening-closing apparatus uses an electrostatic capacity formed between the detection electrode and the vehicle door to detect a change in the electrostatic capacity caused by inserting a hand of the user between the detection electrode and the vehicle door, and recognizes a command of the user.

Japanese Patent Laid Open No. 2005-98016 (refer to paragraphs 90 to 101, FIG. 20, etc.,) discloses a vehicle door opening-closing apparatus for checking the personal identification number as the user grips a door handle and unlocks the door or produces a vibration rhythm by striking the door.

In the vehicle door opening-closing apparatus for detecting a change in the electrostatic capacity between the detection electrode provided for the door handle and the vehicle door in the related art, however, the electrostatic capacity changes if a substance different from the air in medium constant exists between the detection electrode and the vehicle door although the substance is other than a hand of the user. Thus, a change in the electrostatic capacity may also be detected as the environment of rain, etc., changes; the door may be opened regardless of user's intention because of malfunction in a system for automatically performing operation from unlocking to full opening of the door. To open the door, the user always needs to insert a hand into the door handle or operate a remote key; however, if both hands of the user are full, it is difficult to perform door opening or closing operation, and improvement of the operability is demanded.

To open or close the door by rhythmical striking, vibration propagates to the whole vehicle and thus a door for which the user does not perform opening or closing operation is not performed may be opened or closed because of malfunction. There is also a possibility that a door for which the user does not perform opening or closing operation may be opened or closed because of vibration of rain, hail, etc.

SUMMARY OF THE INVENTION

As an illustrative non-limiting embodiment, the present invention can provide a vehicle door opening-closing apparatus, which includes a vibration detector and a controller. The controller acquires an envelope formed by connecting crests or troughs of a waveform of vibration detected by the vibration detection sensor. The controller determines whether or not a shape of the envelope meets a condition. A vehicle door is controlled based on a result of determination by the controller.

Therefore, as one of the advantages of the invention, the invention can provide a vehicle door opening-closing apparatus for providing good door opening or closing operability for the user. As another one of the advantages of the invention, the invention can provide a vehicle door opening-closing apparatus highly resistant to a change in the environment of a rain, etc. As another one of the advantages of the invention, the invention can provide a vehicle door opening-closing apparatus that can well determine whether or not the user perform opening or closing operation for a vehicle door.

These and other advantages of the present invention will be discussed in detail with reference to the accompanying drawings.

DESCRIPTION OF THE PREFERRED EMBODIMENTS

Preferred embodiments of a vehicle door opening-closing apparatus according to the invention will be discussed in detail with reference to the accompanying drawings.

First Embodiment

Figure 1:
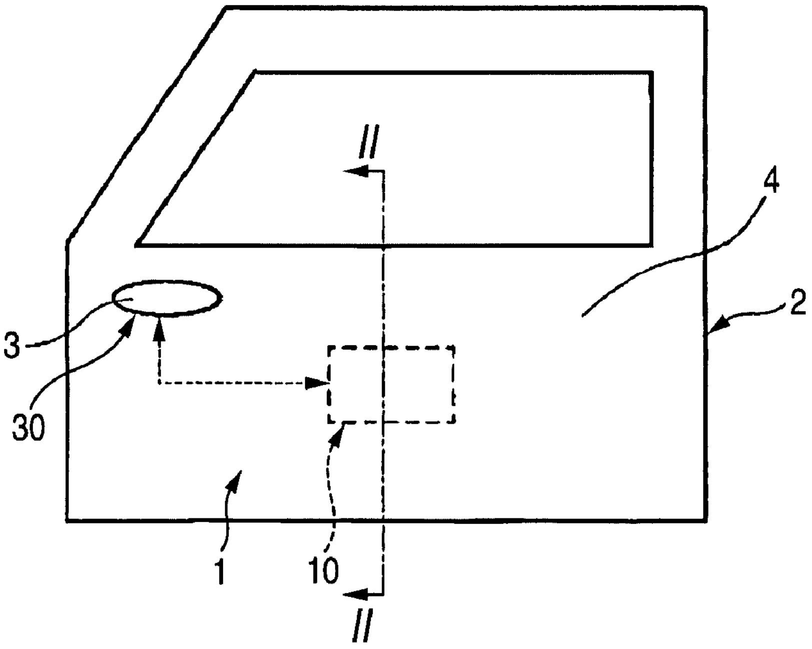
FIG. 1 is a schematic representation of a slide door installing a vehicle door opening-closing apparatus.

FIG. 1 is a schematic representation to show a slide door 2 (vehicle door) installing a vehicle door opening-closing apparatus 1 of the invention. In a first embodiment, the slide door 2 is a door automatically opened and closed by an actuator of a motor, etc., controlled by a door control section 18 described later. In the embodiment, a system for automatically controlling locking and unlocking and opening and closing the door, called smart entry system is installed in a vehicle including the slide door 2. Numeral 30 shown in FIG. 1 schematically indicates vehicle exterior recognition means as one of recognition means of the smart entry system. The vehicle exterior recognition means 30 includes a vehicle exterior driver for controlling communications with the user (occupant) getting off from the vehicle, a communication antenna, etc., (not shown). As one of recognition means of the smart entry system, vehicle interior recognition means (not shown) including a vehicle interior driver for controlling communications with the user in the vehicle interior and a communication antenna is included in the vehicle interior. A system ECU (electronic control unit) (not shown) of the smart entry system for controlling the vehicle exterior recognition means and the vehicle interior recognition means, which is the nucleus of the recognition means, is also included in the vehicle interior.

The smart entry system is a system for communicating with a mobile device carried by the user (occupant) to conduct ID authentication, recognizes that the user approaches the vehicle or gets off from the vehicle and moves to the vehicle outside, and automatically controlling locking and unlocking and opening and closing the vehicle door, as well known. For example, if the user carrying the mobile device approaches the vehicle, the smart entry system recognizes that the user approaches the vehicle and recognizes the user's unlocking intention from predetermining opening-closing operation performed by the user to attempt to open the vehicle door and then performs control so as to automatically unlock the vehicle door. Further, a system for performing control so as to automatically open the vehicle door following unlocking the vehicle door is also put to practical use. Hitherto, as the opening-closing operation, user's operation of putting a hand on a door handle 3, etc., has been detected by a sensor such as a capacitive sensor. The smart entry system is a known technology as it is also described in Japanese Patent Laid Open No. 2004-176343, 2006-70558, etc., and therefore will not be discussed again in detail.

A vibration detection device 10 (vibration detection means) that can communicate with the vehicle exterior recognition means 30 of the smart entry system is included in the vicinity of the center of the slide door 2. The vehicle exterior recognition means 30 of the smart entry system and the vibration detection device 10 are provided for each of the left and right slide doors 2 that can be automatically opened and closed, and communicate with the system ECU of the smart entry system.

Figure 2:
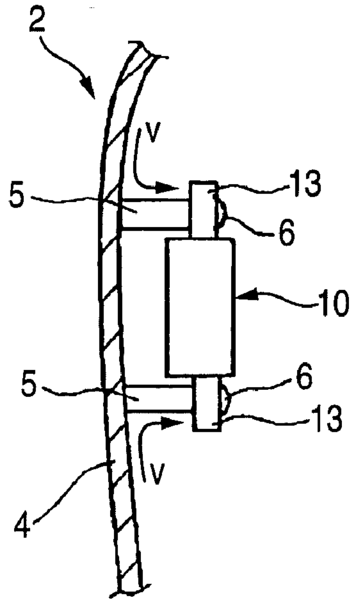
FIG. 2 is a schematic representation to show a state in which a vibration detection device is attached to a door panel forming a slide door in cross section of the slide door taken on line II-II in FIG. 1.

FIG. 2 is a schematic representation to show a state in which the vibration detection device 10 is attached to a door panel 4 forming the slide door 2 in cross section of the slide door 2 taken on line II-II in FIG. 1. The vibration detection device 10 is fixed to the door panel 4 as mounting bosses 5 provided on the door panel 4 and mounting flanges 13 provided on the vibration detection device 10 are fastened with bolts 6. Vibration v produced as the user strikes the slide door 2 or the door handle 3 is propagated to the vibration detection device 10 having the mounting flanges 13 through the door panel 4 and the mounting bosses 5. Preferably, the striking of the user is a knock.

Figure 3:
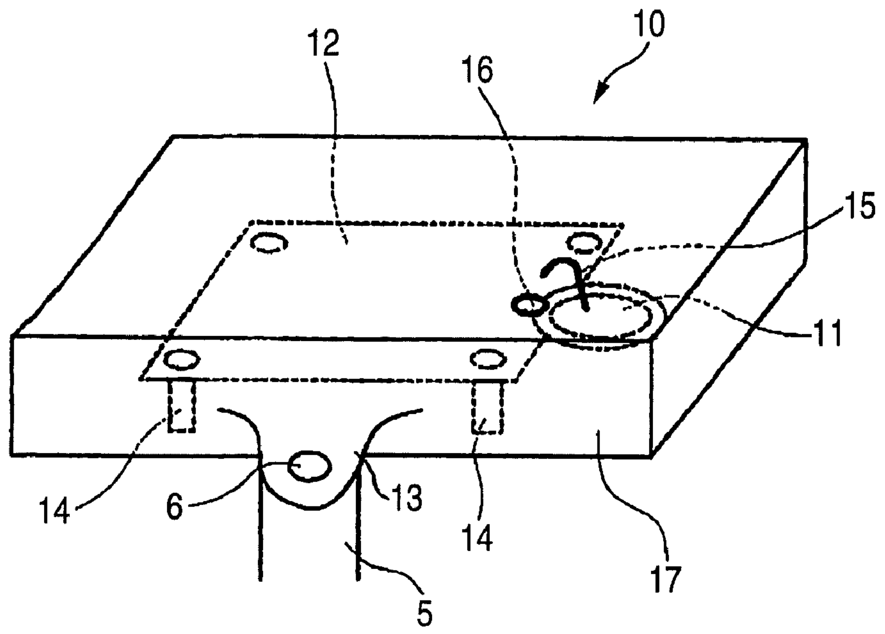
FIG. 3 is a schematic representation to schematically show a configuration example of the vibration detection device.

FIG. 3 is a schematic representation to schematically show a configuration example of the vibration detection device 10. The vibration detection device 10 is made up of a piezoelectric sensor 11 (vibration detection sensor) shaped like a disk, a sensor circuit 12 (control circuit) to which the piezoelectric sensor 11 is attached, struts 14 for supporting the sensor circuit 12, and a frame 17 to which the mounting flanges 13 and the struts 14 are attached. The piezoelectric sensor 11 is soldered to the sensor circuit 12 in a solder part 16 and is fixed so that vibration can be propagated. Vibration v propagated to the vibration detection device 10 through the mounting flanges 13 propagates through the frame 17, the strut 14, and the sensor circuit 12 to the piezoelectric sensor 11. The piezoelectric sensor 11 and the sensor circuit 12 are connected by a signal line 15, and the vibration v detected in the piezoelectric sensor 11 is sent to the sensor circuit 12 as a vibration signal (symbol S described later).

Figure 4:
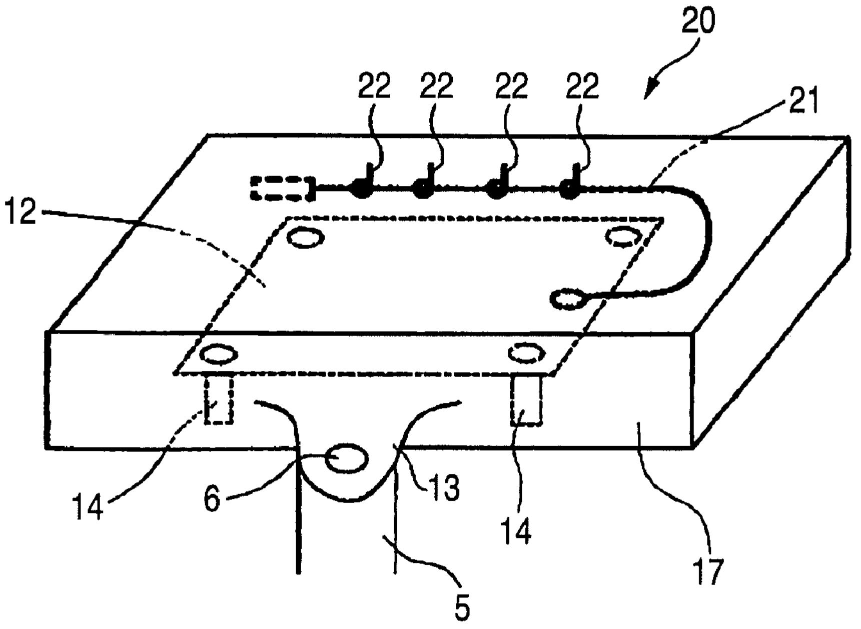
FIG. 4 is a schematic representation to schematically show a configuration example of another vibration detection device.

FIG. 4 is a schematic representation to schematically show a configuration example of a vibration detection device 20 different from the vibration detection device 10 in FIG. 3; it shows an example of using a cable piezoelectric sensor 21 (vibration detection sensor) in place of the piezoelectric sensor 11 shaped like a disk. Parts common to those in FIG. 3 will be discussed using the same reference numerals. The vibration detection device 20 is made up of the cable piezoelectric sensor 21, a sensor circuit 12 connected to the piezoelectric sensor 21, struts 14 for supporting the sensor circuit 12, a frame 17 to which mounting flanges 13 and the struts 14 are attached, and tie wraps 22 fixed to the frame 17 for supporting the piezoelectric sensor 21. Vibration v propagated to the vibration detection device 20 through the mounting flanges 13 propagates through the frame 17 and the tie laps 22 to the piezoelectric sensor 21. The piezoelectric sensor 21 and the sensor circuit 12 are connected and the vibration v detected in the piezoelectric sensor 21 is sent to the sensor circuit 12 as a vibration signal S.

Figure 5:
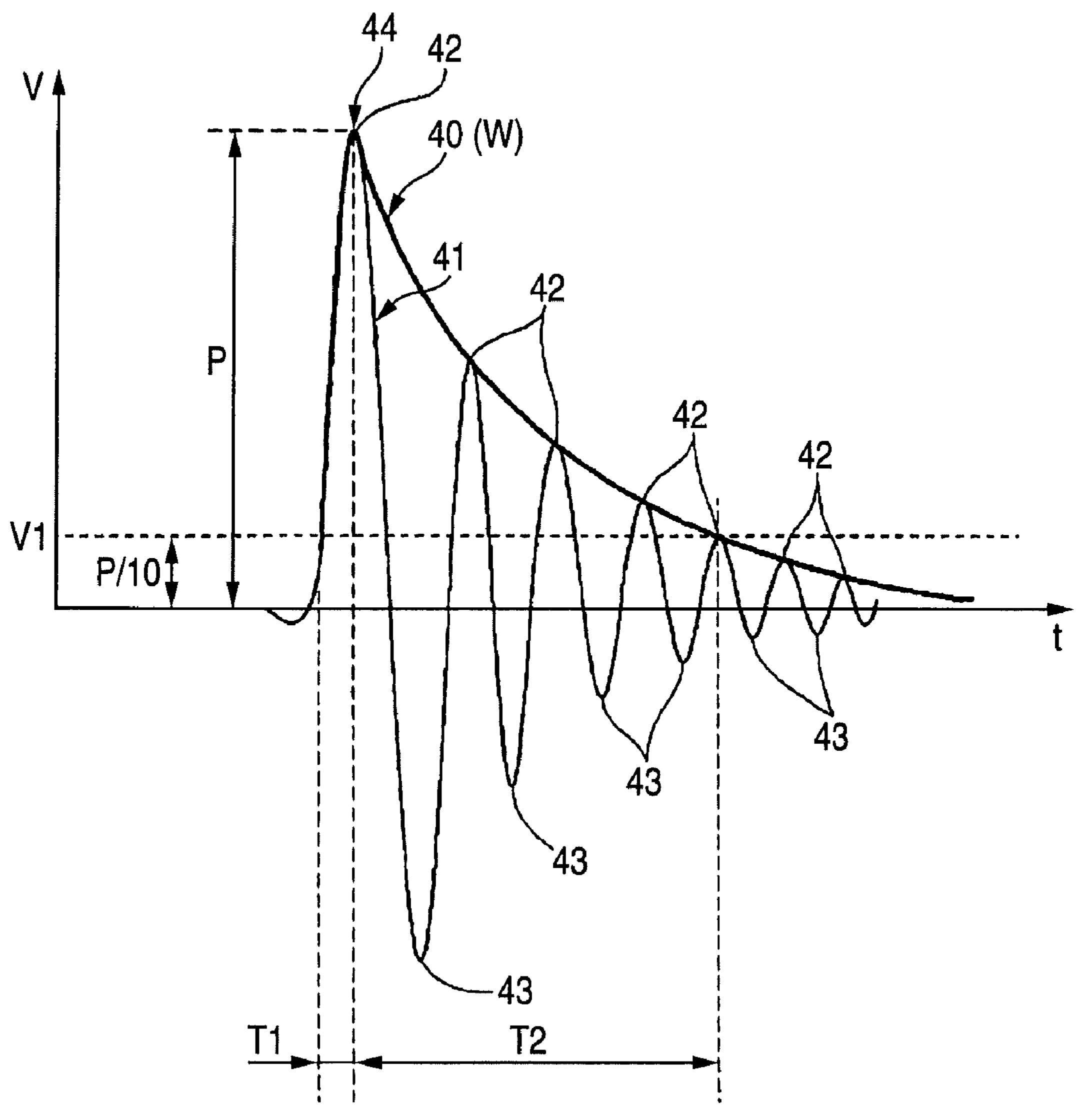
FIG. 5 is a schematic representation to schematically show an example of an envelope acquired from a vibration waveform.

FIG. 5 is a schematic representation to schematically show examples of a vibration waveform 41 obtained from the vibration signal S sent from the piezoelectric sensor 11, 21 to the sensor circuit 12 and an envelope 40 (W) acquired from the vibration waveform 41. The vibration waveform 41 is a waveform provided by removing any other waveform than 100 to 300 Hz through a filter 31 (band-pass filter) 31 shown in FIG. 7 from the vibration waveform S. The sensor circuit 12 acquires the envelope 40 formed by connecting crests 42 of the vibration waveform 41. The envelope 40 is acquired, whereby noise of engine vibration caused by running and idling, vibration caused by the sound of a vehicle-installed audio system, vibration caused by rain, hail, etc., can be removed. Consequently, malfunction caused by noise can be prevented as compared with the case where a determination is made from the vibration waveform 41. In the example, the envelope 40 formed by connecting the crests 42 of the vibration waveform 41 is acquired, but an envelope may be acquired by connecting troughs 43 of the vibration waveform 41.

An envelope may be acquired by performing full-wave rectification of the vibration waveform 41 to the plus or minus side of voltage V shown in the figure and connecting the crests or the troughs of the waveform after the full-wave rectification. In the waveform after the full-wave rectification, the spacing between the crests or the spacing between the troughs becomes narrow as compared with that in the waveform before the full-wave rectification, so that it is made possible to acquire an envelope with higher accuracy.

In the invention, from the shape of the envelope W, a distinction can be made between the slide door 2 for which the user performs opening or closing operation and a different door to prevent the different door from malfunctioning. From the shape of the envelope W, a distinction can be made between vibration caused by user's opening or closing operation and vibration caused by occurrence of any other event to prevent the slide door 2 from malfunctioning. Specifically, whether or not the user performs opening or closing operation is determined based on increase time T1 until the envelope W reaches a peak value P from a predetermined threshold value V1 and attenuation time T2 for which the envelope W attenuates from the peak value P to the predetermined threshold value V1.

In the embodiment, a value of one tenth of the peak voltage (peak value P) of the envelope 40 is adopted as the threshold voltage (threshold value V1). The threshold value V1 can be changed as desired. For example, a standard threshold value V1 may be set from a standard peak value P of an average value, etc., without setting the threshold value V1 for each envelope. The rising time (increase time T1) until the envelope W reaches the peak value P after exceeding the threshold value V1 is set to within several ms (for example, within 3 to 5 ms). The attenuation time T2 for which the envelope W attenuates from the peak value P to the predetermined threshold value V1 is set to within 150 ms The attenuation time T2 changes depending on the size and the attachment position of the slide door 2, the material of the door panel 4, etc. The attenuation time T2 can be found from expressions (1) and (2):

$$X=ae^{-\alpha\omega t} \quad (1)$$

$$\omega=2\pi f \quad (2)$$

where X: Voltage, a: Peak voltage, α: Attenuation characteristic, ω: Angular velocity, t: Attenuation time, and f: Frequency. The attenuation characteristic α is a variable dependent on the door panel 4, such as the plate thickness, the material, the size, attachment to the vehicle, etc., of the door panel 4.

In the waveform example shown in FIG. 5, the envelope 40 formed by connecting the crests of the vibration waveform 41 is adopted as the envelop W used for determination and thus the increase time T1 becomes the rising time until the envelope W reaches the peak value P after exceeding the threshold value V1. However, if the envelop W used for determination is acquired by connecting the troughs of the vibration waveform 41, the threshold value V1 is set to the trough side and the increase time T1 becomes the falling time until the envelope W reaches the peak value P after exceeding the threshold value V1 in the negative direction.

Figure 6:
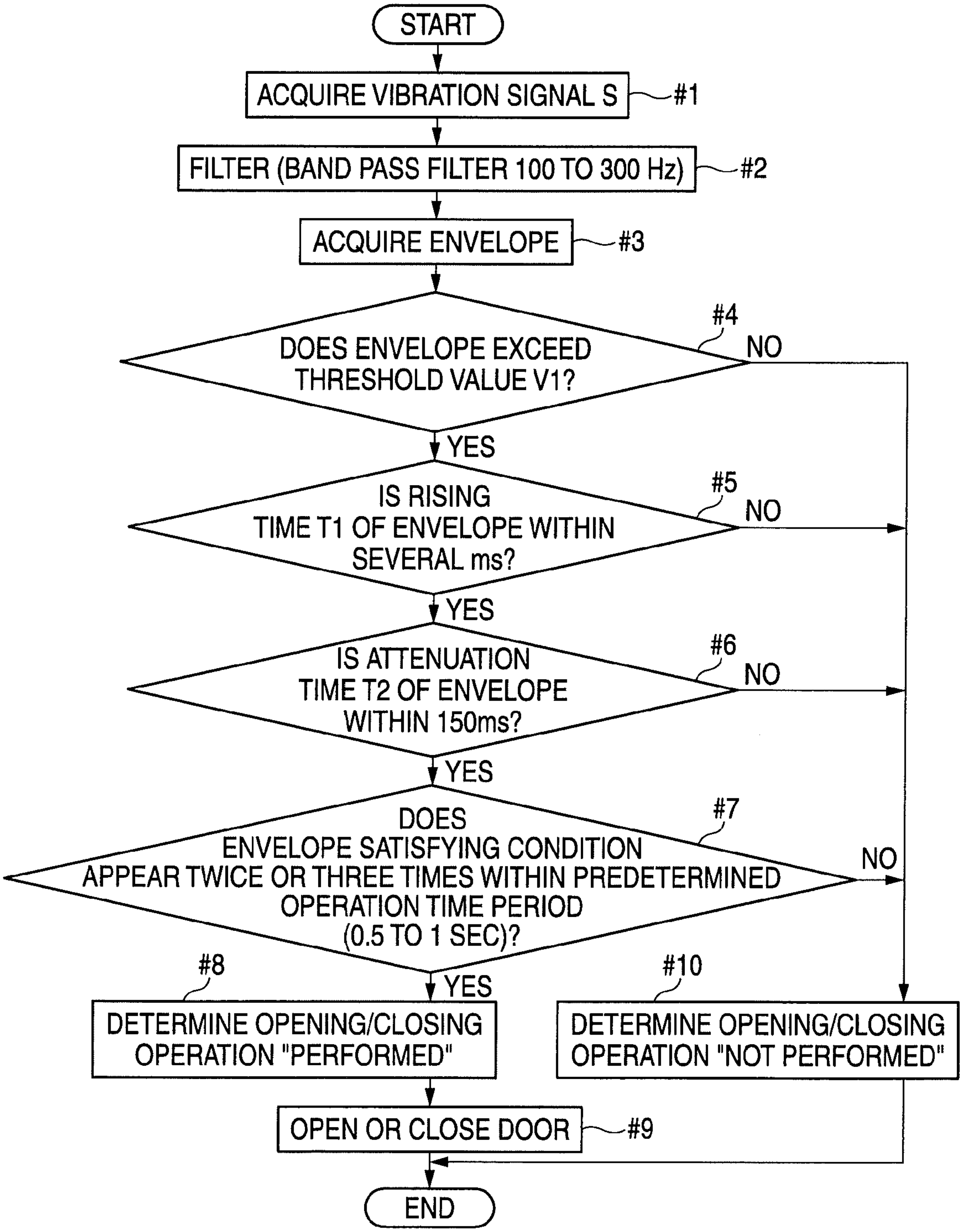
FIG. 6 is a flowchart to show an example of a processing procedure of a vehicle door opening-closing apparatus of a first embodiment of the invention.
Figure 7:
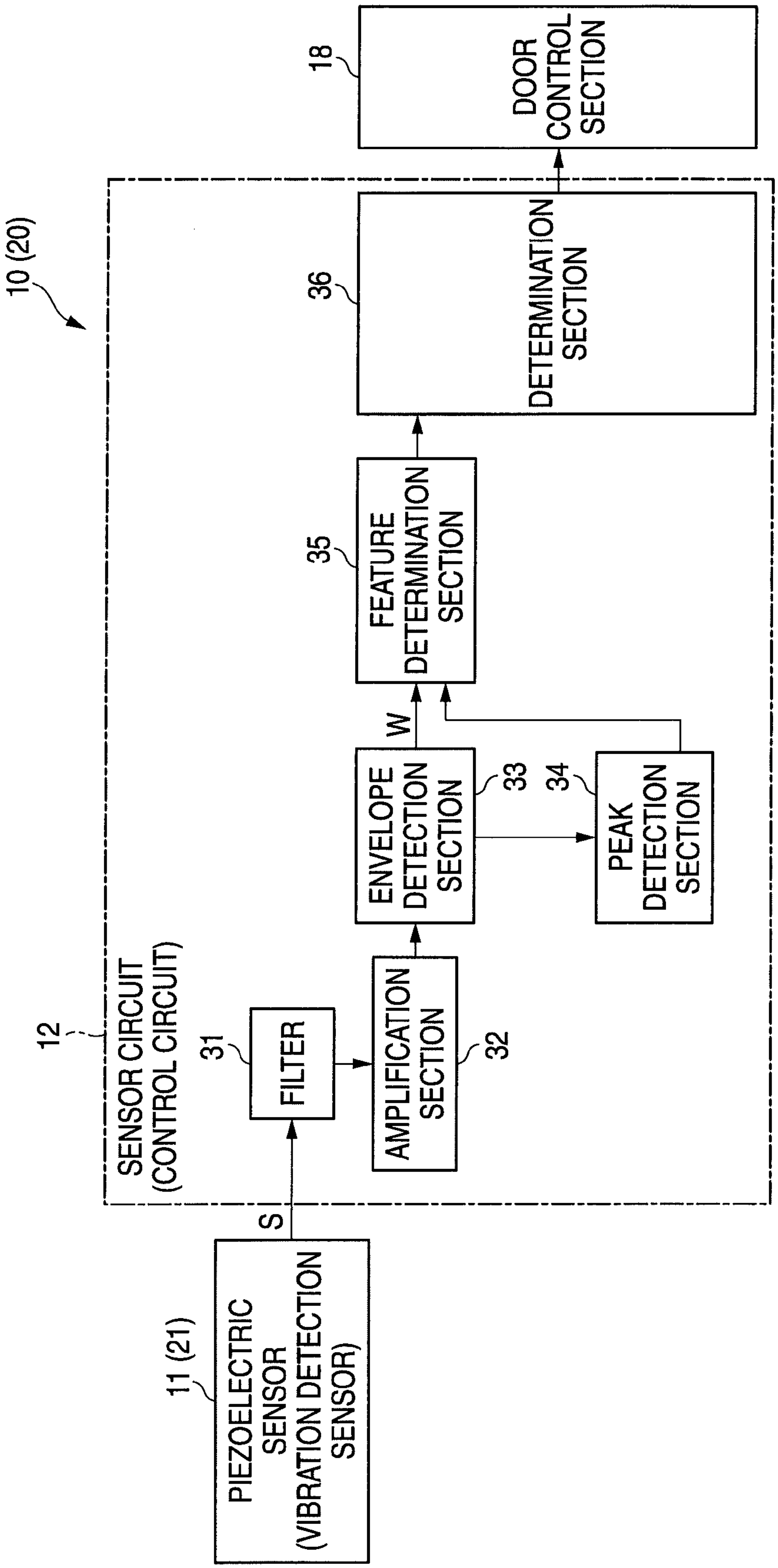
FIG. 7 is a block diagram to schematically show the configuration of the vehicle door opening-closing apparatus of the first embodiment of the invention.

A procedure for the vehicle door opening-closing apparatus according to the embodiment to determine whether or not the user performs opening or closing operation will be discussed in detail. FIG. 6 is a flowchart to show an example of the processing procedure of the vehicle door opening-closing apparatus of the first embodiment of the invention. FIG. 7 is a block diagram to schematically show the configuration of the vehicle door opening-closing apparatus of the first embodiment of the invention.

To begin with, the sensor circuit 12 (control circuit) acquires a vibration signal S generated by striking the vehicle from the piezoelectric sensor (vibration detection sensor) 11 (#1). Next, a filter section 31 of the sensor circuit 12 filters the sent vibration signal S to take out a signal of 100 to 300 Hz (#2). An amplification section 32 of the sensor circuit 12 amplifies the signal taken out through the BPF, and an envelope detection section 33 acquires an envelope W from a vibration waveform 41 of the post-amplified signal (#3). The amplification section 32 is not indispensable and the envelope W may be acquired from the signal provided by the filtering. Then, the sensor circuit 12 executes steps #4 to #6 for determining whether or not the shape of the envelope W is a shape produced as the user strikes the slide door 2 or the door handle 3. Steps #4 to #6 can be executed in any order.

A feature determination section 35 of the sensor circuit 12 determines whether or not the envelope W exceeds a threshold value V1 (#4). If the envelope W exceeds the threshold value V1, the feature determination section 35 determines whether or not the rising time (increase time T1) until the envelope W reaches a peak value P detected in a peak detection section 34 after exceeding the threshold value V1 is within a predetermined increase allowed time (for example, several ms) (#5). If the feature determination section 35 determines that the rising time (increase time T1) is within several ms, it determines whether or not the attenuation time T2 for which the envelope W attenuates from the peak value P to the threshold value V1 is within an attenuation allowed time (150 ms) (#6). If it is determined that the attenuation time T2 is within 150 ms, a determination section 36 of the sensor circuit 12 determines that the shape of the envelope W is a shape produced as the user strikes the slide door 2 to perform opening or closing operation.

Here, the determination section 36 may send the determination result of "opening/closing operation "performed"" to the door control section 18 (#8). The door control section 18 may open or close the slide door 2 by assuming that the user intends to open or close the slide door 2 by striking (#9). However, preferably the determination section 36 further executes step #7 before step #8 as described below:

At step #7, the determination section 36 determines whether or not the shape of the envelope W produced as the user strikes appears twice or three times (more than once) for 0.5 to 1.0 second (predetermined operation time period) during which the user successively strikes the slide door 2 or the door handle 3. If the shape of the envelope W appears twice or three times (more than once) during the predetermined operation time period, the determination section 36 determines that the user intends to open or close the slide door 2 by striking. The door control section 18 opens or closes the slide door 2 based on the determination result (#9).

If the predetermined condition is not satisfied at step #4, #5, #6, or #7, the determination section 36 determines "opening/closing operation "not performed"" (#10). The door control section 18 does not open or close the slide door 2 based on the determination result.

The vehicle door opening-closing apparatus 1 of the invention detects vibration produced as the user gives opening or closing operation to the slide door 2, and opens or closes the slide door 2, so that good operability can be provided if both hands of the user are full. Since whether or not the user performs the slide door 2 opening or closing operation (operation of striking the door) is determined from the envelope W acquired from the vibration waveform 41 from the piezoelectric sensor 11, 21, malfunction of the slide door 2 caused by noise of vibration at the running time, vibration caused by rain, hail, etc., or the like can be prevented as compared with the case where a determination is made from the vibration waveform S. Whether or not the user performs the slide door 2 opening or closing operation is determined from the shape of the envelope W and the slide door 2 is opened or closed accordingly, so that a distinction is made between the slide door 2 for which the user performs opening or closing operation and a different slide door 2 and the different slide door 2 is prevented from malfunctioning.

The sensor circuit 12 determines whether or not the user performs the slide door 2 opening or closing operation from the increase time T1 until the envelope W reaches the peak value P after exceeding the predetermined threshold value V1 and the attenuation time T2 for which the envelope W attenuates from the peak value P to the predetermined threshold value V1, so that a distinction is made between the slide door 2 for which the user performs opening or closing operation and a different slide door 2 and the different slide door 2 is more reliably prevented from malfunctioning.

The sensor circuit 12 determines whether or not the user performs the slide door 2 opening or closing operation from the number of times the increased and attenuated envelope W has appeared within the predetermined operation time period (0.5 to 1.0 s) (twice or three times). Thus, if the user gives vibration to the slide door 2 without intending to perform opening or closing operation (for example, if the body of the user touches the door), malfunctioning of the slide door 2 regardless of user's intention is prevented.

Second Embodiment

A second embodiment of the invention will be discussed. The topics previously described with reference to FIGS. 1 to 5, namely, the structure of vibration detection device 10, the shape determination method of the waveform of an envelope W, and the like are similar to those of the first embodiment and therefore will not be discussed again where appropriate. The second embodiment is a preferred embodiment if the opening or closing operation given by the user to a vehicle door such as a slide door 2 is successive striking of the vehicle door or an opening/closing operation section such as a door handle 3 provided on the vehicle door. For example, knocking twice or three times generally performed is a preferred embodiment of user's successive striking. A sensor circuit 12 as a control circuit determines whether or not the user performs vehicle door opening or closing operation based on a peak value P of an envelope W acquired at the first time, of successively acquired envelopes W and the shape of the envelope W acquired at the second time or later.

Figure 8:
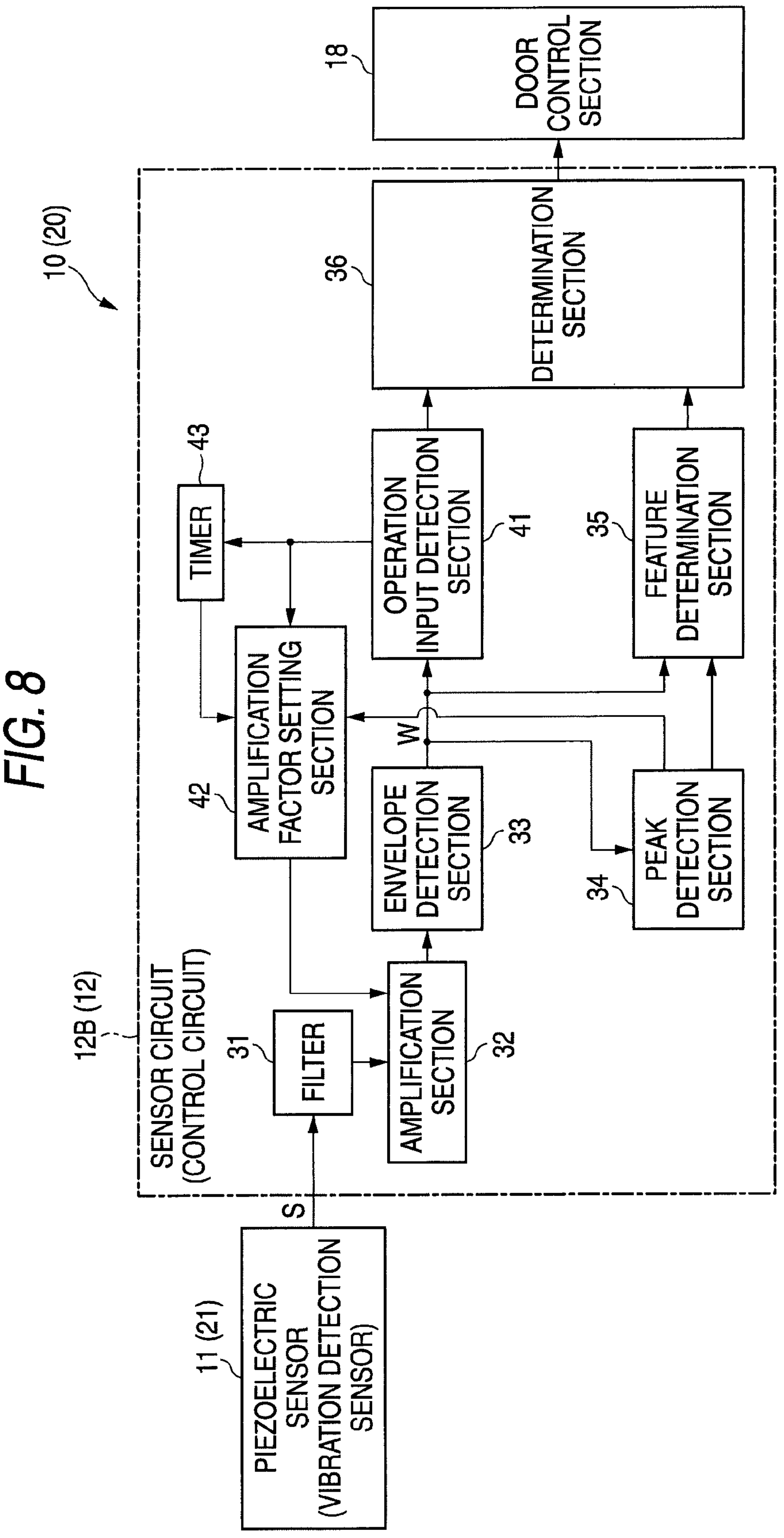
FIG. 8 is a block diagram to schematically show the configuration of a vehicle door opening-closing apparatus of a second embodiment of the invention.
Figure 9:
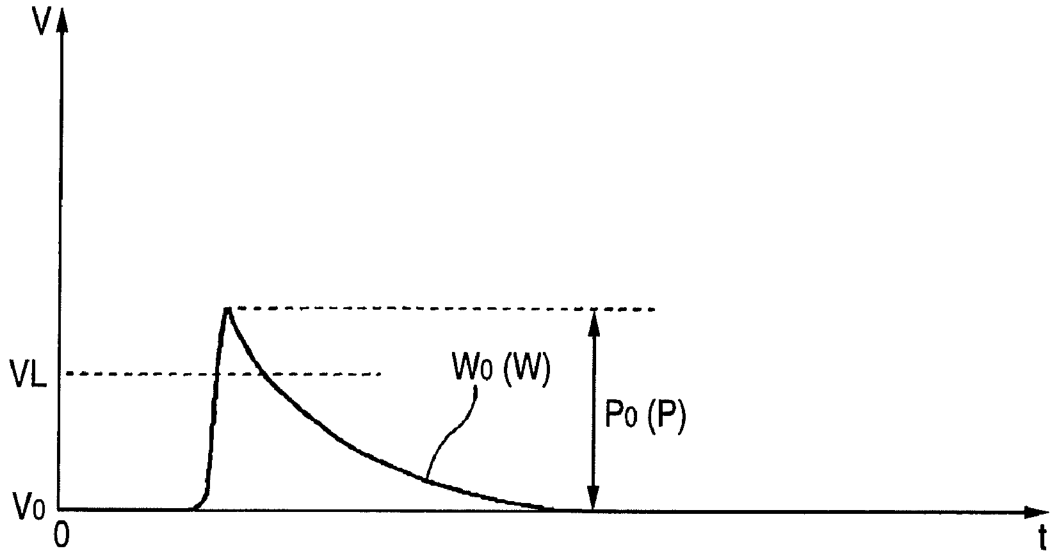
FIG. 9 is a schematic representation to show the detection principle of operation input in the second embodiment of the invention.
Figure 10:
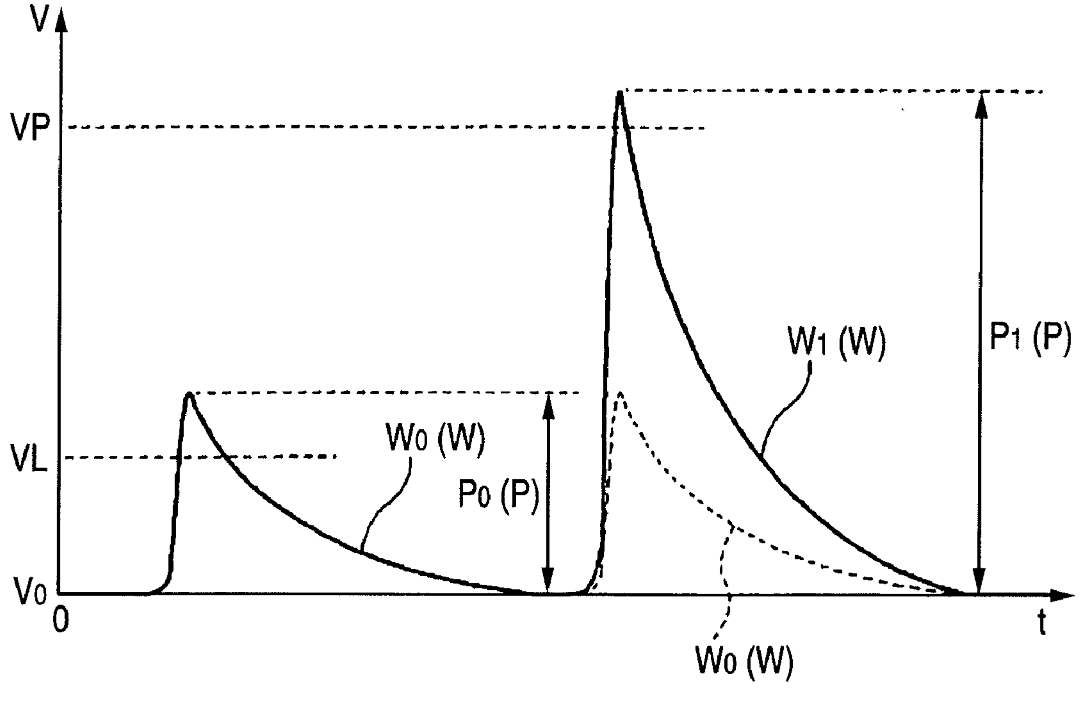
FIG. 10 is a schematic representation to show the determination principle in the second embodiment of the invention.
Figure 11:
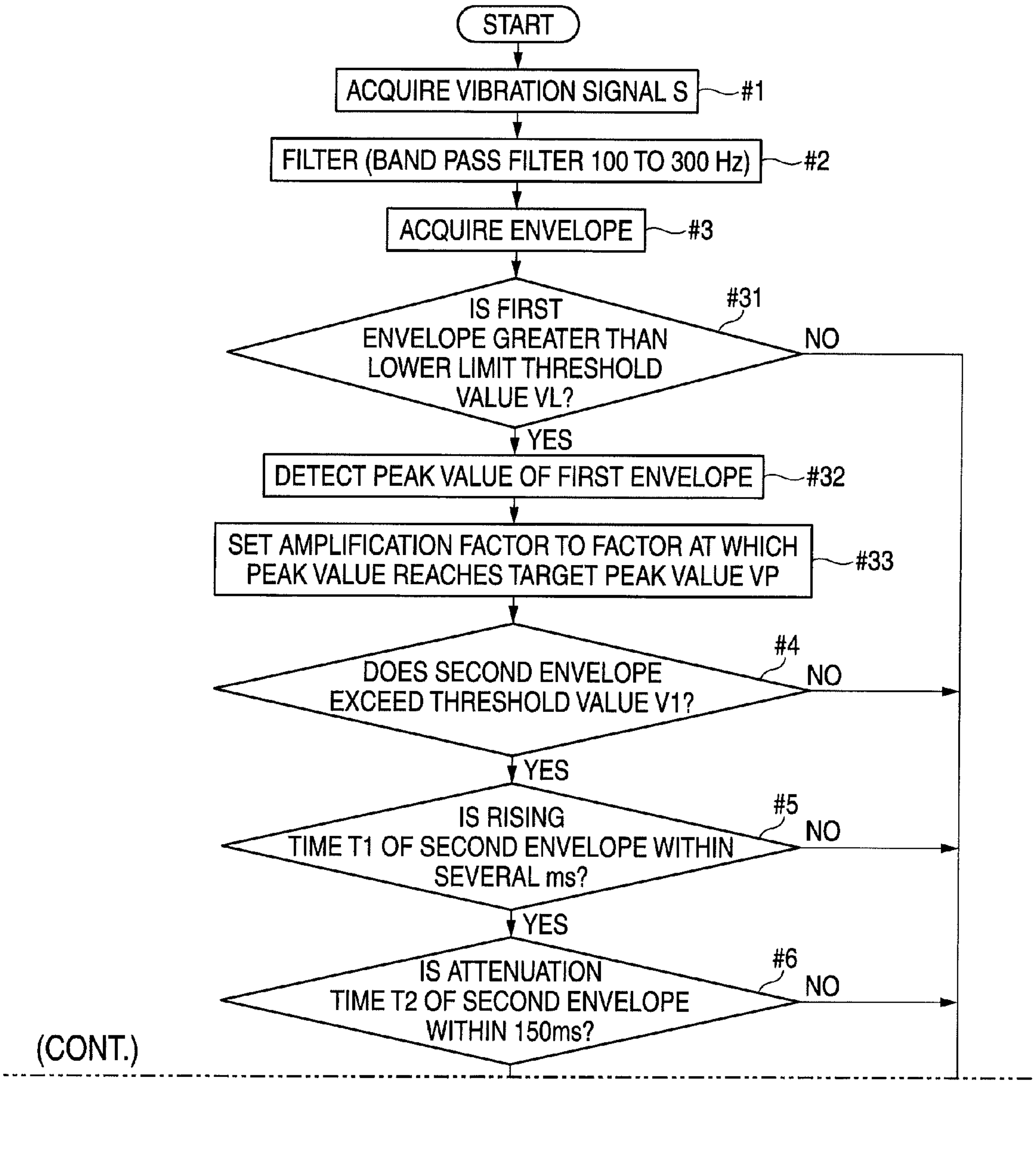
FIG. 11 is a flowchart to show an example of a processing procedure of the vehicle door opening-closing apparatus of the second embodiment of the invention.

FIG. 8 is a block diagram to schematically show the configuration of a vehicle door opening-closing apparatus of the second embodiment of the invention, FIG. 9 is a schematic representation to show the detection principle of operation input in the second embodiment of the invention, FIG. 10 is a schematic representation to show the determination principle in the second embodiment of the invention, and FIG. 11 is a flowchart to show an example of a processing procedure of the vehicle door opening-closing apparatus of the second embodiment of the invention.

As shown in FIG. 8, a sensor circuit 12A (control circuit) of the second embodiment is provided by adding an operation input detection section 41, an amplification factor setting section 42, and a timer 43 to the sensor circuit 12 of the first embodiment. A determination section 36 determines whether or not the user performs opening or closing operation for a slide door 2 based on the determination result of a feature determination section 35 and the detection result of the operation input detection section 41.

If an envelope W ($W_0$) exceeds a predetermined lower limit threshold value VL as shown in FIG. 9, the operation input detection section 41 detects operation input. At this time, preferably the amplification factor of an amplification section 32 is set to a low amplification factor (initial amplification factor) containing one time by the amplification factor setting section 42. The lower limit threshold value VL is set by assuming the case where vibration of opening or closing operation as the user strikes (knocks on, etc.,) the slide door 2 by a general force is the smallest. This means that the lower limit threshold value VL is set so that the peak value P of the envelope W exceeds the lower limit threshold value VL if the vibration is the assumed smallest vibration.

The peak value $P_0$ of the envelope $W_0$ is detected by a peak detection section 34. The amplification factor setting section 42 sets the amplification factor of the amplification section 32 based on the peak value $P_0$ and a predetermined target peak value VP. This means that the amplification factor is set to a factor at which a peak value $P_1$ of an envelope $W_1$ reaches at least the target peak value VP as shown in FIG. 10 (in the example shown in FIG. 10, the peak value $P_1$ exceeds the target peak value VP). The amplification factor is set if the peak value $P_0$ of the envelope $W_0$ acquired at the first time (first envelope) exceeds the lower limit threshold value VL. If the opening or closing operation is knocking, successively applied vibrations generate vibration waveforms of almost the same amplitude. Therefore, the envelope $W_1$ acquired at the second time or later (second envelope) is acquired from a vibration waveform 41 with a vibration signal S amplified so that the peak value $P_1$ reaches the target peak value VP.

The target peak value VP is set to a value equal to or greater than the threshold value V1 described above in the first embodiment. Therefore, the peak value $P_1$ of the second envelope $W_1$ reliably exceeds the threshold value V1 and the shape of the envelope W is determined based on an increase time T1 and an attenuation time T2 as in the first embodiment.

The duration of the time that the striking operation (knocking) sequence continues is measured with the timer 43. When a predetermined time has elapsed, the timer 43 resets the amplification factor setting section 42 and the amplification factor setting section 42 sets the initial amplification factor in the amplification section 32. The amplification factor may be set to the initial amplification factor as the timer 43 resets the amplification section 32.

The magnitude of vibration given to the slide door 2 varies depending on the individual difference among the users or from one time to another if the same user is applied. According to the experiment of the inventor, a disparity of about 20 times exists between the maximum magnitude of vibration and the minimum magnitude of vibration. If the amplification factor of the amplification section 32 is large relative to the magnitude of vibration given by the user, the post-amplified vibration waveform 41 may become saturated in the power supply voltage or the limit voltage of the circuit. In this case, the correct envelope W cannot be acquired from the vibration waveform 41 and there is a possibility that it may become impossible for the feature determination section 35 to determine the shape of the envelope W. However, an appropriate amplification factor is set each time, whereby the envelope W such that the peak value P falls within an almost constant range is provided as the principle was previously described with reference to FIGS. 9 and 10. Therefore, if the magnitude of vibration given by the user falls within the general range, the sensor circuit 12A can acquire the envelope W with the peak value P always falling within a constant range regardless of the magnitude of vibration. The shape of the envelope W can be well determined as in the first embodiment.

A procedure for the vehicle door opening-closing apparatus according to the embodiment to determine whether or not the user performs opening or closing operation will be discussed in detail. As in the first embodiment, to begin with, the sensor circuit 12A (control circuit) acquires a vibration signal S generated by striking the vehicle from a piezoelectric sensor (vibration detection sensor) 11 (#1). Next, a filter section 31 of the sensor circuit 12 filters the sent vibration signal S to take out a signal of 100 to 300 Hz (#2). An amplification section 32 of the sensor circuit 12 amplifies the taken out signal at the initial amplification factor, and an envelope detection section 33 acquires an envelope W ($W_0$) from a vibration waveform 41 of the post-amplified signal (#3).

Next, the operation input detection section 41 determines whether or not the first envelope $W_0$ exceeds the lower limit threshold value VL (#31). If the first envelope $W_0$ exceeds the lower limit threshold value VL, then the peak value $P_0$ of the first envelope $W_0$ is detected by the peak detection section 34 (#32). The amplification factor setting section 42 sets the amplification factor of the amplification section 32 based on the peak value $P_0$ and the predetermined target peak value VP. This means that the amplification factor is set to a factor at which the peak value $P_1$ of the envelope $W_1$ reaches at least the target peak value VP as shown in FIG. 10 (#33).

Since the amplification factor of the amplification section 32 is changed in real time, the second envelope $W_1$ is generated from the vibration waveform 41 amplified so that the peak value $P_1$ reaches at least the target peak value VP according to a new amplification factor. Strictly, the second envelope $W_1$ is acquired by executing steps #1 to #3 after step #33 in FIG. 11. However, the flowcharts shown in FIGS. 6, 11, and 14 do not strictly show software processing and show the technical philosophy of the invention realized in cooperation with hardware that can perform parallel processing. Therefore, simplified drawings in the range in which those skilled in the art can understand are used in the description.

The second envelope $W_1$ has the peak value P1 reliably exceeding the threshold value V1 without becoming saturated. Therefore, the sensor circuit 12 executes steps #4 to #6 similar to those of the first embodiment, thereby determining whether or not the shape of the envelope W is a shape produced as the user strikes the slide door 2 or the door handle 3. Details are as described above and therefore will not be discussed again.

Here, the determination section 36 may send the determination result of "opening/closing operation "performed"" to a door control section 18 (#8). The door control section 18 may open or close the slide door 2 by assuming that the user intends to open or close the slide door 2 by striking (#9). However, preferably the determination section 36 further executes step #7 before step #8 as described below:

At step #7, the determination section 36 determines whether or not the shape of the second envelope $W_1$ produced as the user strikes appears twice or three times (more than once) for 0.5 to 1.0 s (predetermined operation time period) during which the user successively strikes the slide door 2 or the door handle 3. If the shape of the envelope W appears twice or three times (more than once) during the predetermined operation time period, the determination section 36 determines that the user intends to open or close the slide door 2 by striking. The door control section 18 opens or closes the slide door 2 based on the determination result (#9).

If the predetermined condition is not satisfied at step #31, #4, #5, #6, or #7, the determination section 36 determines "opening/closing operation "not performed"" (#10). The door control section 18 does not open or close the slide door 2 based on the determination result.

The magnitude of vibration given to the slide door 2 varies depending on the individual difference among the users or from one time to another if the same user is applied. However, according to the second embodiment, if the magnitude of vibration given by the user falls within the general range, the sensor circuit 12A can acquire the envelope W with the peak value P always falling within a constant range regardless of the magnitude of vibration. The shape of the envelope W can be well determined as in the first embodiment.

Third Embodiment

A third embodiment of the invention will be discussed. The topics previously described with reference to FIGS. 1 to 5, namely, the structure of vibration detection device 10, the shape determination method of the waveform of an envelope W, and the like are similar to those of the first embodiment and therefore will not be discussed again where appropriate. The third embodiment is similar to the second embodiment in that an amplification factor is set based on the peak value $P_0$ of the envelope $W_0$ acquired at the first time, of successively acquired envelopes W and that whether or not the user performs vehicle door opening or closing operation is determined based on the shape of the envelope W1 acquired at the second time or later and therefore the topics will not be discussed again where appropriate. The third embodiment is a preferred embodiment for determining that a vibration signal S is generated based on non-operation input which is not general striking (knocking) of the user based on the peak value $P_0$ of the envelope $W_0$ acquired at the first time.

Figure 12:
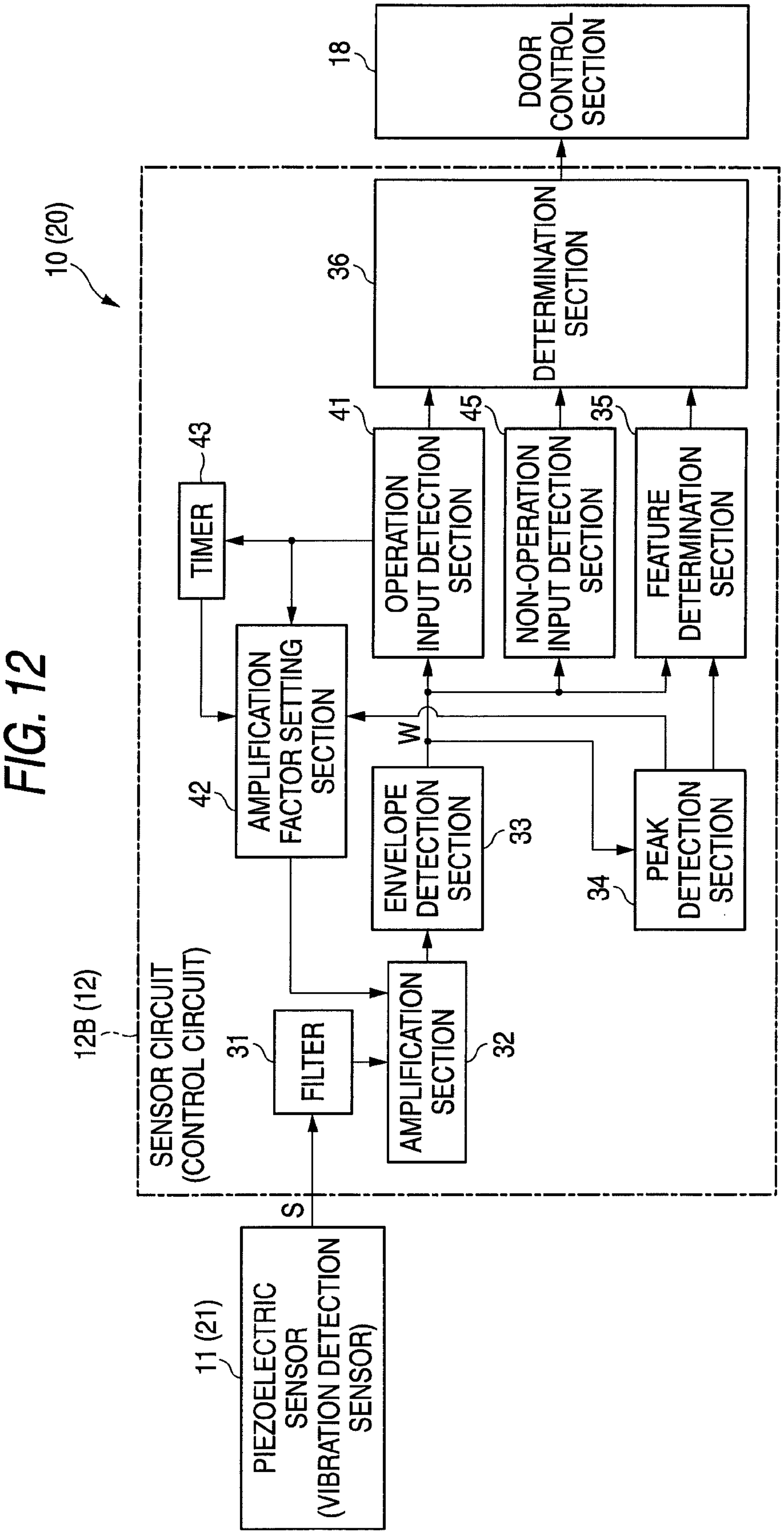
FIG. 12 is a block diagram to schematically show the configuration of a vehicle door opening-closing apparatus of a third embodiment of the invention.
Figure 13:
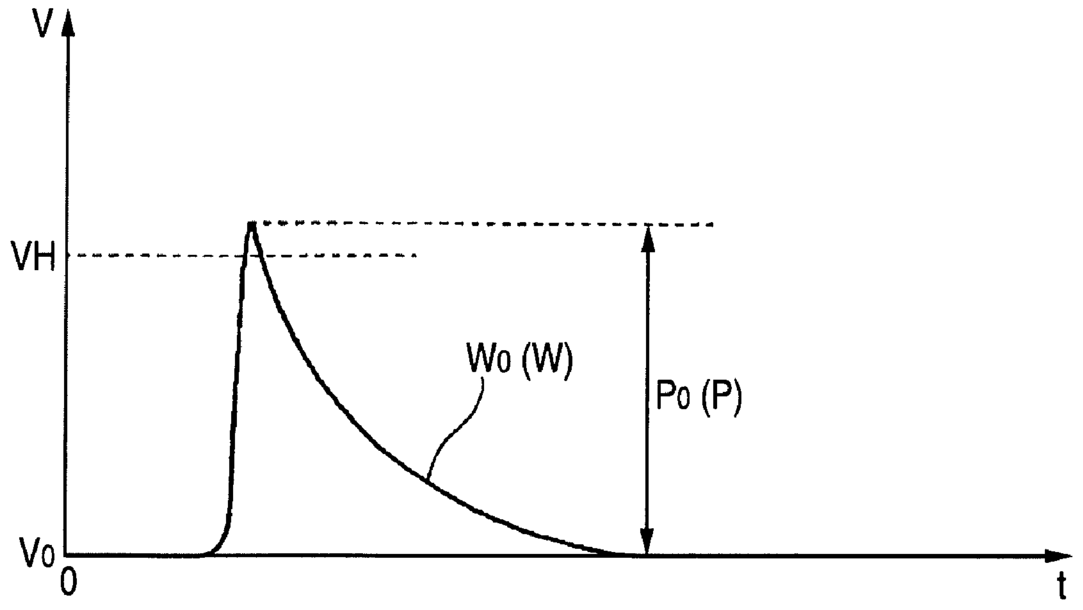
FIG. 13 is a schematic representation to show the detection principle of non-operation input in the third embodiment of the invention.
Figure 14:
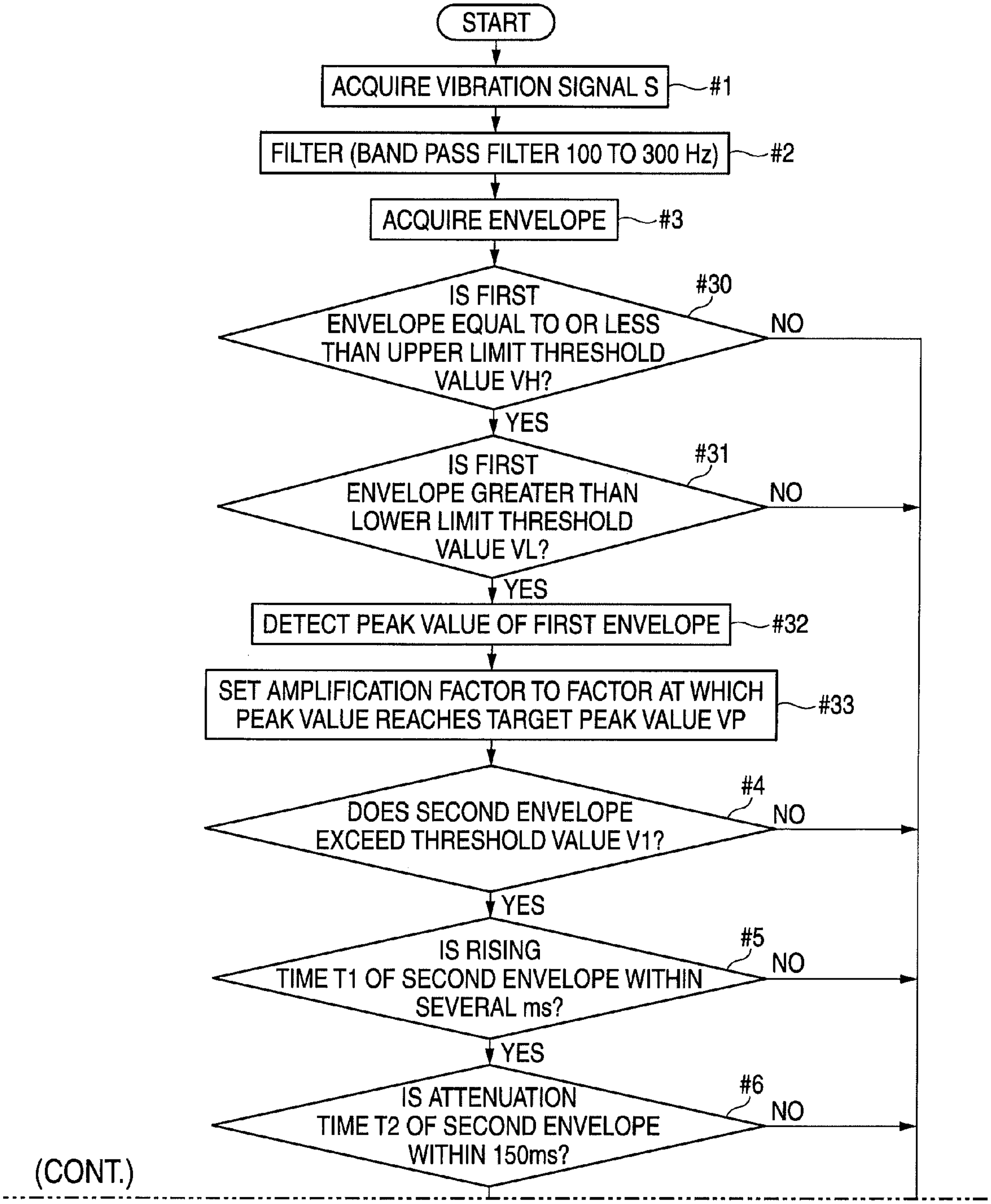
FIG. 14 is a flowchart to show an example of a processing procedure of the vehicle door opening-closing apparatus of the third embodiment of the invention.

FIG. 12 is a block diagram to schematically show the configuration of a vehicle door opening-closing apparatus of the third embodiment of the invention, FIG. 13 is a schematic representation to show the detection principle of non-operation input in the third embodiment of the invention, and FIG. 14 is a flowchart to show an example of a processing procedure of the vehicle door opening-closing apparatus of the third embodiment of the invention.

As shown in FIG. 12, a sensor circuit 12B (control circuit) of the third embodiment is provided by adding a non-operation input detection section 45 to the sensor circuit 12 of the second embodiment. A determination section 36 determines whether or not the user performs opening or closing operation for a slide door 2 based on the determination result of a feature determination section 35, the detection result of the operation input detection section 41, and the detection result of the non-operation input detection section 45.

If an envelope W ($W_0$) exceeds a predetermined upper limit threshold value VH set to a larger value than a lower limit threshold value VL as shown in FIG. 13, the non-operation input detection section 45 detects non-operation input. This means that it is detected that the envelope $W_0$ is not generated based on the vibration signal S generated by general striking of knocking, etc., of the user. At this time, the amplification factor of an amplification section 32 is set to a low amplification factor (initial amplification factor) containing one time by an amplification factor setting section 42 as previously described in the second embodiment. Therefore, if the envelope $W_0$ exceeds the upper limit threshold value VH regardless of such a low amplification factor, it indicates that an external force generating very large vibration has been applied to the slide door 2.

Although details are described later, if the peak value $P_0$ of the envelope $W_0$ acquired at the first time exceeds the upper limit threshold value VH set to a larger value than the lower limit threshold value VL, the sensor circuit 12B (determination section 36) determines that the user does not perform opening or closing operation for the vehicle door (slide door 2) regardless of the shape of an envelope $W_1$ acquired at the second time or later.

Preferably, the upper limit threshold value VH is set to the same value as the target peak value VP described in the second embodiment, for example. The target peak value VP is almost equivalent to the peak value P of the envelope W preferable after the amplification factor of the amplification section 32 is properly set, as described above. The fact that the envelope W exceeds the target peak value VP when the amplification factor of the amplification section 32 is the initial amplification factor of a small value means that the vibration signal S is too large. Therefore, the target peak value VP is preferable as a guide for setting the upper limit threshold value VH.

A procedure for the vehicle door opening-closing apparatus according to the embodiment to determine whether or not the user performs opening or closing operation will be discussed in detail. As in the first embodiment and the second embodiment, to begin with, the sensor circuit 12B (control circuit) acquires a vibration signal S generated by striking the vehicle from a piezoelectric sensor (vibration detection sensor) 11 (#1). Next, a filter section 31 of the sensor circuit 12 filters the sent vibration signal S to take out a signal of 100 to 300 Hz (#2). An amplification section 32 of the sensor circuit 12 amplifies the taken out signal at the initial amplification factor, and an envelope detection section 33 acquires an envelope W ($W_0$) from a vibration waveform 41 of the post-amplified signal (#3).

Next, the non-operation input detection section 45 determines whether or not the first envelope $W_0$ exceeds the upper limit threshold value VH (#30). If it is determined that the first envelope $W_0$ exceeds the upper limit threshold value VH, the determination section 36 determines "opening/closing operation "not performed"" (#10). If the first envelope $W_0$ is equal to or less than the upper limit threshold value VH, the operation input detection section 41 determines whether or not the first envelope $W_0$ exceeds the lower limit threshold value VL, (#31) as in the second embodiment. The later steps are similar to those of the second embodiment.

According to the third embodiment, if the magnitude of vibration given by the user does not fall within the general range, the sensor circuit 12B determines that the vibration signal S caused by the vibration is not based on the opening or closing operation of the user. Therefore, whether or not the user performs opening or closing operation can be determined with good accuracy.

Supplemental Remarks to Second and Third Embodiments

A determination based on the number of times the envelope W (W1) has appeared within the predetermined operation time period is made at step #7 in the second and third embodiments. Additional information on this point is provided. That is, a supplementary explanation is given to the case where the sensor circuit 12 determines whether or not the user performs the slide door 2 opening or closing operation from the number of times the increased and attenuated envelope W has appeared within the predetermined operation time period. In the description to follow, the case where the sensor circuit 12 determines that the user performs the slide door 2 opening or closing operation if the envelope W appears twice or more within the operation time period.

Figure 15:
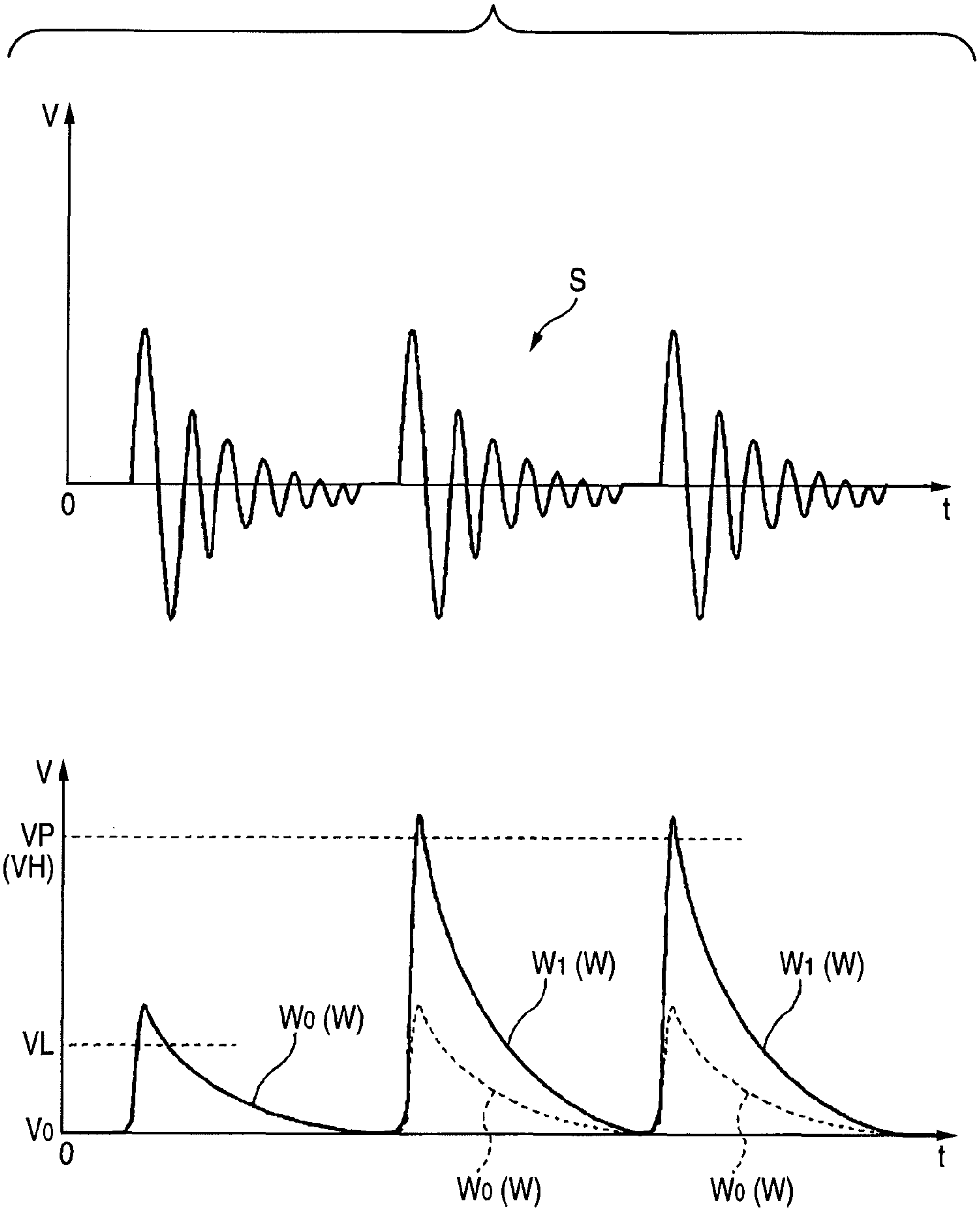
FIG. 15 is a schematic representation to show the determination principle according to the number of envelopes appearing within a predetermined operation time period.

FIG. 15 is a schematic representation to show the determination principle according to the number of envelopes W appearing within the predetermined operation time period. The waveform chart shown at the upper stage of FIG. 15 shows the vibration signal S schematically. It shows the case where the user knocks three times like "rat-tat-tat," for example, as striking the door of the vehicle. The user knocks three times almost at the same time intervals almost by the same force. The time period during which the waveform shown in FIG. 15 appears is about 0.5 s to 1 s.

The waveform chart shown at the lower stage of FIG. 15 schematically shows the envelopes W acquired from the vibration waveform 41 after amplified by the amplification section 32. The left envelope W at the lower stage of FIG. 15 corresponds to the first envelope $W_0$ in the second and third embodiments. Since the first envelope $W_0$ exceeds the lower limit threshold value VL, the amplification factor setting section 42 sets a new amplification factor in the amplification section 32 based on the peak value $P_0$ of the first envelope $W_0$. Since the first envelope $W_0$ does not exceed the upper limit threshold value VH, the shape of the first envelope $W_0$ is determined as described in the third embodiment. The upper limit threshold value VH and the target peak value VP are the same value.

The center envelope W at the lower stage of FIG. 15 is an envelope W acquired at the second time and corresponds to the second envelope $W_1$ in the second and third embodiments. The second envelope $W_1$ is acquired from the vibration waveform 41 after amplified according to a larger amplification factor and thus has a peak value $P_1$ larger than the first envelope $W_0$ and the peak value $P_1$ exceeds the target peak value VP. The envelope W satisfies the determination criteria of the increase time T1 and the attenuation time T2.

The right envelope W at the lower stage of FIG. 15 is an envelope W acquired at the third time and corresponds to the second envelope $W_1$ in the second and third embodiments. The second envelope $W_1$ is also acquired from the vibration waveform 41 after amplified according to a larger amplification factor and thus has a peak value $P_1$ larger than the first envelope $W_0$ and the peak value $P_1$ exceeds the target peak value VP. The envelope W also satisfies the determination criteria of the increase time T1 and the attenuation time T2.

That is, in the waveform example shown at the lower stage of FIG. 15, the envelope W satisfying the determination criteria appears twice within the predetermined operation time period of 0.5 s to 1 s. If it is thus acknowledged that the envelope W satisfying the determination criteria appears twice or more within the predetermined operation time period, the determination section 36 determines that the user has performed opening or closing operation. A higher-accuracy determination is made possible as compared with the case where a determination is made based on a single envelope W.

If the envelope W appears three times or more within a predetermined operable time period (for example, 0.5 s) set shorter than the operation time period of 0.5 s to 1 s, the sensor circuit 12 determines that the user does not perform opening or closing operation for the slide door 2. The user may knock more than once like "rat-tat-tat, . . . ," for example, as striking the door of the vehicle. However, usually the speed of striking that can be accomplished by a human being is limited. It is difficult for a general user to knock three times during 0.5 s. Therefore, when the envelope W appears three times or more within the predetermined operable time period, if the determination section 36 determines that the user does not perform opening or closing operation for the slide door 2, a precise determination is made possible.

Fourth Embodiment

A fourth embodiment of the invention will be discussed. The topics previously described with reference to FIGS. 1 to 4, namely, the structure of vibration detection device 10 and the like are similar to those of the first embodiment and therefore will not be discussed again where appropriate. In the fourth embodiment, the signal strength and the similarity of the shape feature are used as representation of the shape of an envelope W. Specifically, whether or not the user performs door opening or closing operation is determined based on the signal strength determined by a duration T4 until an envelope W attenuated through the peak after exceeding a predetermined first threshold value Vt returns to the first threshold value Vt and the similarity determined by the shape feature of the envelope W.

The similarity is determined based on the envelope shape feature derived from the attenuation characteristic of the envelope W attenuated through the peak. The attenuation characteristic changes depending on the size and the attachment position of a slide door 2, the material of the door panel 4, etc., but can be previously defined in each vehicle and each door of each vehicle. Since the attenuation characteristic $\alpha$ is determined in each door of each vehicle according to expressions (1) and (2) described above, the shape feature of each envelope W can be found from attenuation time t of each envelope W. It is possible to determine the similarity from the shape feature. Preferably, the similarity is the gradient of an attenuation approximate line calculated based on the difference between the first threshold value Vt and a second threshold value Vd and the attenuation time for which the envelope W attenuated through the peak attenuates from the second threshold value Vd to the first threshold value Vt, as shown in expression (3) given below. The gradient of the attenuation approximate line can be found by performing linear calculation, and the computation load on a sensor circuit 12B (12) is lightened. In expression (3), an example of finding the gradient of the attenuation approximate line is shown:

$$\text{Attenuation characteristic} = \text{gradient of attenuation approximate line} = (Vt - Vd)/T1 \qquad (3)$$

For example, the similarity of the attenuation characteristic of each envelope W (gradient of attenuation approximate line) found in expression (3) is found relative to the standard attenuation characteristic (gradient of attenuation approximate line) determined from a standard envelope W obtained when the user performs opening or closing operation. The similarity can be found according to the ratio between the gradient of the attenuation approximate line of the standard envelope W and the gradient of the attenuation approximate line of each envelope W. The value range of the gradient of the attenuation approximate line may be defined and if the attenuation characteristic of each envelope W is contained within the range, the similarity may be determined 100%; otherwise, the similarity may be determined 0%.

The signal strength is determined by the duration T4 until the envelope W attenuated through the peak after exceeding the predetermined first threshold value Vt returns to the first threshold value Vt, as described above. The duration T4 becomes long if the peak value P of the envelope W is large; the duration T4 becomes short if the peak value P is small. Therefore, it can be determined that if the duration T4 is within a predetermined reference time, the amplitude of a vibration waveform 41 is within a predetermined range and the magnitude of vibration is within a predetermined range. This means that the magnitude of vibration is equal to or less than the maximum allowed amplitude value according to the duration T4. Preferably, the reference time for which the duration T4 is allowed is set to 100 ms to 150 ms, for example. The first threshold value Vt is set to the peak side of the envelope W rather than the amplitude center of the vibration waveform 41.

On the other hand, it can be determined that the magnitude of vibration is a predetermined value or more as the peak of the envelope W reaches a third threshold value Va set to the peak side of the envelope W above the first threshold value Vt. This means that the magnitude of vibration is equal to or more than the minimum allowed amplitude according to the third threshold value Va. That is, if the peak of the envelope W reaches the third threshold value Va and the duration T4 is within the predetermined reference time, it can be determined that the signal strength is within the allowable range.

To find the duration T4, the peak of the envelope W needs to reach the second threshold value Vd and the third threshold value Va at least needs to be the same value as the second threshold value Vd or more than the second threshold value Vd. Therefore, the second threshold value Vd and the third threshold value Va may be the same value.

Figure 16:
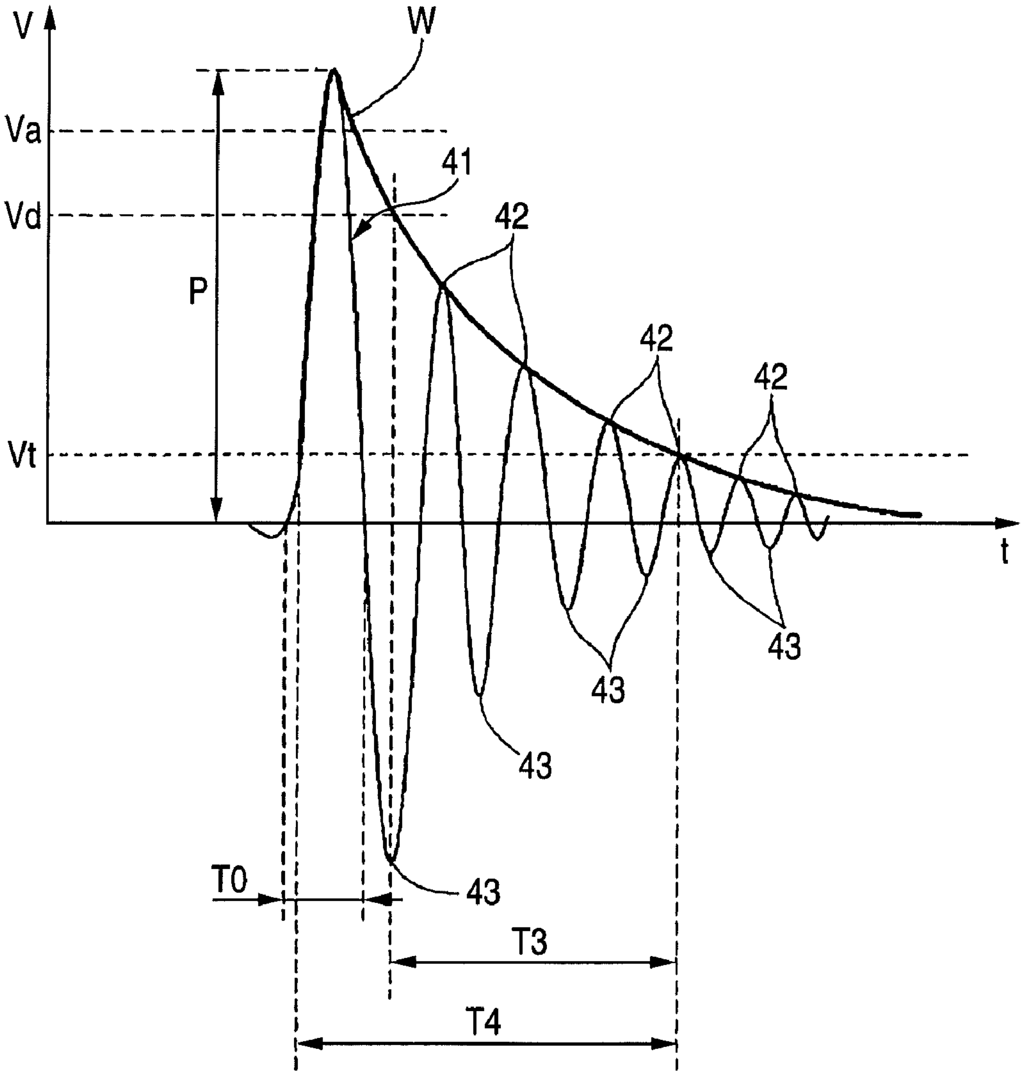
FIG. 16 is a schematic representation to schematically show an example of an envelope acquired from a vibration waveform.

In a waveform example shown in FIG. 16, an envelope W provided by connecting the crests of the vibration waveform 41 is adopted as the envelope W to be used for determination and thus the gradient of the attenuation approximate line found in expression (3) becomes a negative value. If an envelope W provided by connecting the troughs of the vibration waveform 41 is adopted as the envelope W to be used for determination, the gradient of the attenuation approximate line found in expression (3) becomes a positive value. The gradient of the attenuation approximate line may be calculated as an absolute value.

Figure 17:
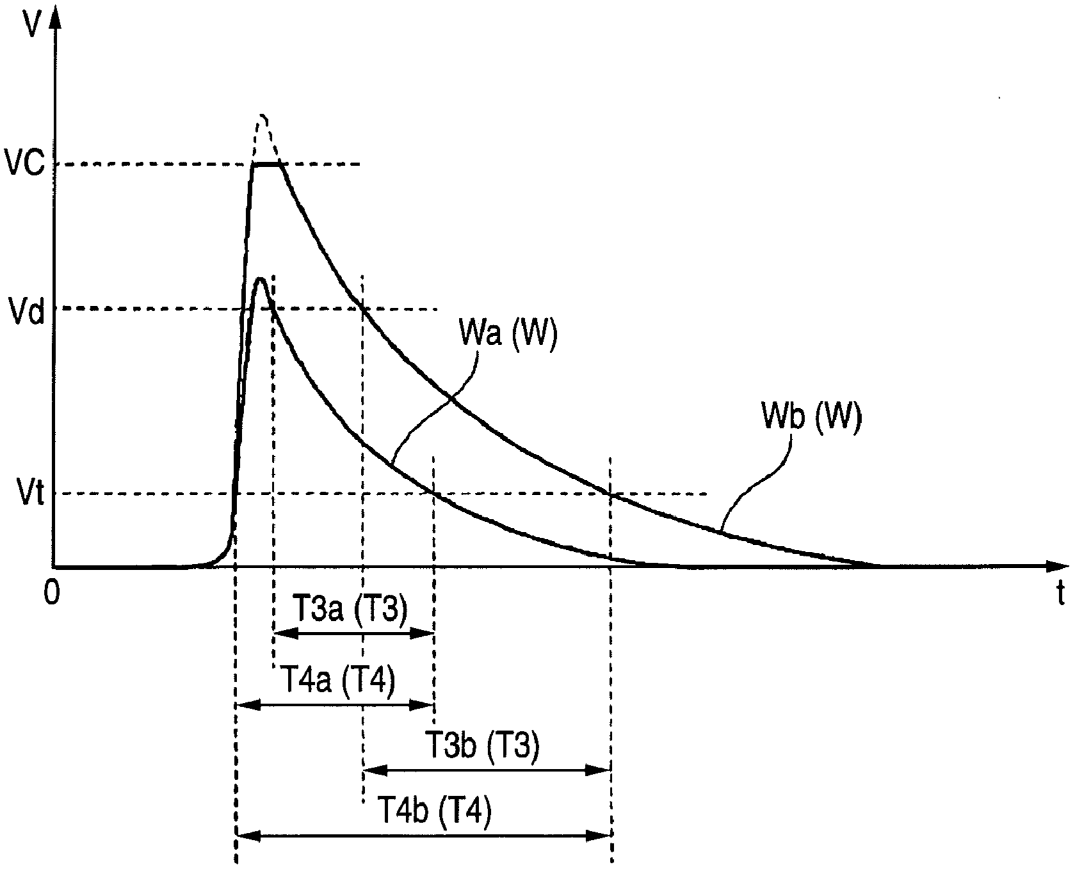
FIG. 17 is a schematic representation to schematically show the relationship between the strength of door opening or closing operation and an envelope.

As described above, the envelope W is evaluated according to the duration T4 and the similarity determined by the gradient of the attenuation approximate line and whether or not the user performs door opening or closing operation is determined, whereby a good determination is made possible without being largely dependent on the strength of the door opening or closing operation of the user. FIG. 17 is a schematic representation to schematically show the relationship between the strength of the door opening or closing operation and the envelope W. Additional information on the principle of making a good determination possible regardless of the strength of the door opening or closing operation of the user if the strength is within a common-sense range by applying the invention is provided using FIG. 18. The term "common-sense range" mentioned here is vibration except vibration caused by a shock if a human being hits against the vehicle and except vibration of strength less than vibration caused by raindrops in a rain in a predetermined rainfall amount (for example, a heavy rain such that two or three raindrops hit against the vehicle during 100 ms).

The magnitude of vibration given to the slide door 2 varies depending on the individual difference among the users or from one time to another if the same user is applied. According to the experiment of the inventor, a disparity of about 20 times is observed between the maximum strength and the minimum strength. If the strength giving a vibration is large, a waveform is clipped at a saturation voltage VC because of limitations of the power supply voltage, the circuit operation range, etc., like an envelope Wb shown in FIG. 17. Therefore, the signal strength cannot be determined and the attenuation time from the peak cannot be found either according to the peak value of the envelope W.

As described above, according to the invention, however, the signal strength is determined according to the duration T4. The first threshold value Vt to find the duration T4 is a value on the bottom side of the envelope W below the saturation voltage VC (in the example shown in FIG. 17, a voltage lower than the saturation voltage VC). Therefore, if a waveform becomes saturated at the saturation voltage VC like the envelope Wb shown in FIG. 17, a duration time T4*b* can be well found and the signal strength can be determined. Since the first threshold value Vt is a value on the bottom side of the envelope W below the saturation voltage VC, an envelope Wa caused by a weak vibration also crosses the first threshold value Vt at the increase time and at the attenuation time. Therefore, a duration time T4*a* can be well found and the signal strength can be determined. If the vibration is not based on the opening or closing operation of the user and the peak value is larger than the envelope Wb, the duration T4 is prolonged and exceeds a predetermined reference time, of course.

The gradient of the attenuation approximate line, which becomes the attenuation characteristic, can also be well found without being largely dependent on the vibration strength. The second threshold value Vd to find the gradient of the attenuation approximate line is a value less than the saturation voltage VC and thus the envelope W caused by a strong vibration to such an extent that the peak becomes saturated always reaches the second threshold value Vd. Since the second threshold value Vd is less than the third threshold value Va, the envelope W caused by a weak vibration to such an extent that the peak value just reaches the third threshold value Va also always reaches the second threshold value Vd. Therefore, the envelope W contained in a predetermined strength range always reaches or crosses the second threshold value Vd when it attenuates from the peak. If the vibration is caused by the opening or closing operation of the user, the gradient of the attenuation approximate line roughly matches.

For example, the gradient of the attenuation approximate line of the envelope Wb with the peak saturated and the gradient of the attenuation approximate line of the envelope Wa with the peak unsaturated roughly match as shown in the following expression (4):

$$(Vt-Vd)/T3b \approx (Vt-Vd)/T3a \quad (4)$$

Thus, a good determination is made possible regardless of whether or not the peak becomes saturated, namely, regardless of the strength of the door opening or closing operation of the user.

Figure 18:
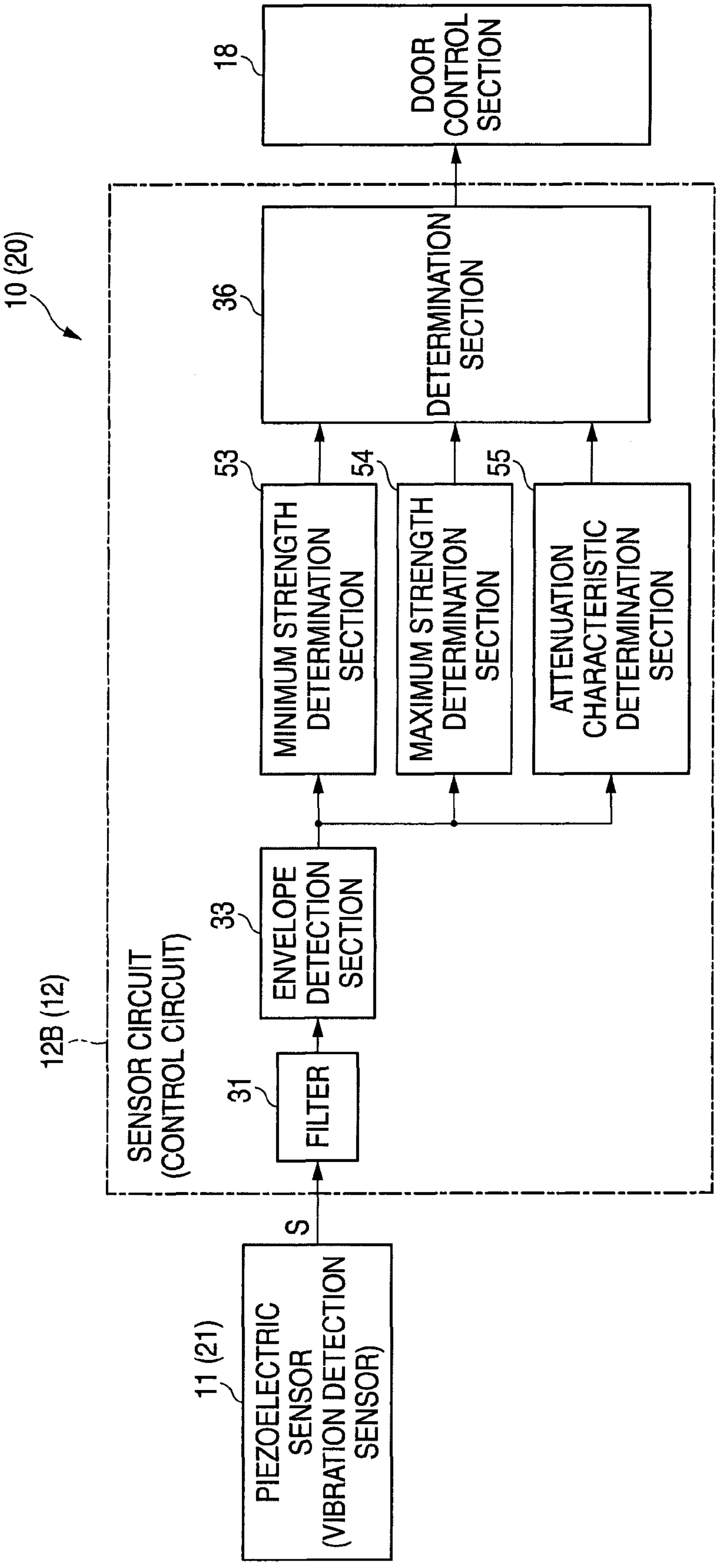
FIG. 18 is a block diagram to schematically show the configuration of a vehicle door opening-closing apparatus of a fourth embodiment of the invention.
Figure 19:
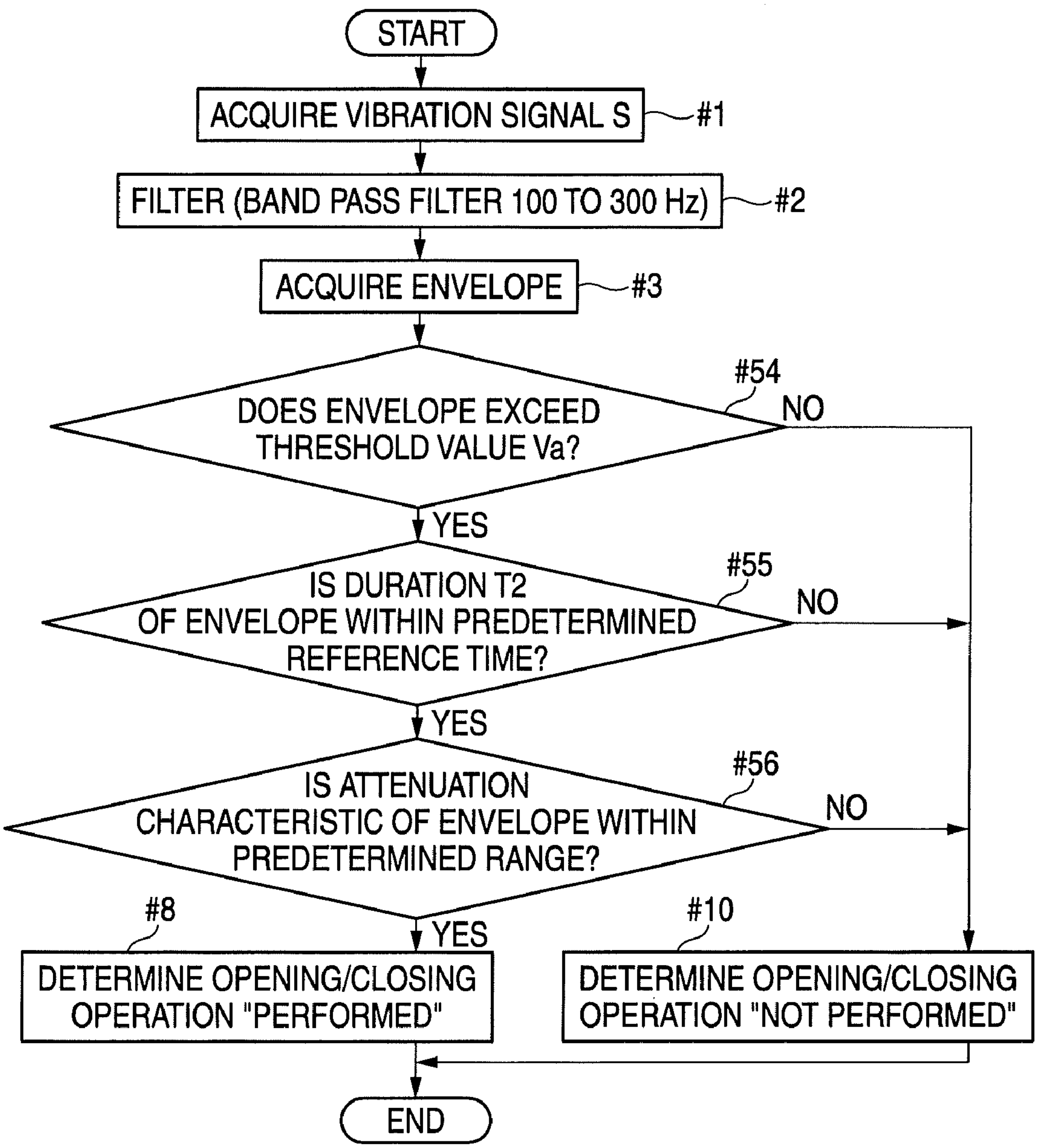
FIG. 19 is a flowchart to show an example of a processing procedure of the vehicle door opening-closing apparatus of the fourth embodiment of the invention.

A procedure for a vehicle door opening-closing apparatus according to the embodiment to determine whether or not the user performs opening or closing operation will be discussed in detail. FIG. 18 is a block diagram to schematically show the configuration of the vehicle door opening-closing apparatus. FIG. 19 is a flowchart to show an example of the processing procedure of the vehicle door opening-closing apparatus.

To begin with, the sensor circuit (control circuit) 12B (12) acquires a vibration signal S generated by striking the vehicle from a piezoelectric sensor (vibration detection sensor) 11 (#1). Next, a filter section 31 of the sensor circuit 12B filters the sent vibration signal S to take out a signal of 100 to 300 Hz (#2). When the vibration signal S is sent from the piezoelectric sensor 11 (21) to the sensor circuit 12B, if A/D conversion processing is performed, the filter section 31 performs known digital filtering. At this time, the filter section 31 can find the frequency of a vibration waveform 41 not only by the known digital filtering, but also according to a technique of measuring T0 shown in FIG. 16 or the like.

Next, an envelope detection section 33 acquires an envelope W from the vibration waveform 41 (#3). Then, the sensor circuit 12B executes steps #54 to #56 for determining whether or not the signal strength of the envelope W and the similarity of the shape feature of the envelope W are those produced as the user strikes the slide door 2 or a door handle 3. Steps #54 to #56 can be executed in any order. An amplification section may be provided between the piezoelectric sensor 11 and the sensor circuit 12B or between the filter section 31 and the envelope detection section 33 in FIG. 18 for amplifying the vibration signal S or the vibration signal after filtered.

A minimum strength determination section 53 of the sensor circuit 12B determines whether or not the envelope W exceeds the third threshold value Va (#54). The minimum strength determination section 53 may determine whether or not the envelope W reaches the third threshold value Va. If the envelope W exceeds the third threshold value Va, a maximum strength determination section 54 finds the duration T4 until the envelope W attenuated through the peak after exceeding the predetermined first threshold value Vt returns to the first threshold value Vt. The maximum strength determination section 54 determines whether or not the duration T4 is within a predetermined reference time (#55). If the duration T4 is within the predetermined reference time, an attenuation characteristic determination section 55 determines whether or not the attenuation characteristic of the envelope W (gradient of attenuation approximate line) is within a predetermined range.

If it is determined that the attenuation characteristic is within the predetermined range, a determination section 36 determines that the envelope W is based on the vibration signal S produced as the user performs opening or closing operation (#8). This means that the determination section 36 determines "opening/closing operation "performed"" and outputs the determination result to a door control section 18. Based on the determination result, the door control section 18 opens or closes the slide door 2 by assuming that the user intends to open or close the slide door 2 by striking.

If the predetermined condition is not satisfied at step #54, #55, or #56, the determination section 36 determines "opening/closing operation "not performed"" (#10). The door control section 18 does not open or close the slide door 2 based on the determination result.

The vehicle door opening-closing apparatus of the invention detects vibration produced as the user gives opening or closing operation to the slide door 2, and opens or closes the slide door 2, so that good operability can be provided if both hands of the user are full. Since whether or not the user performs the slide door 2 opening or closing operation (operation of striking the door) is determined from the envelope W acquired from the vibration waveform 41 input from the piezoelectric sensor 11, malfunction of the slide door 2 caused by noise of vibration of the vehicle, vibration caused by rain, hail, etc., or the like can be prevented as compared with the case where a determination is made from the vibration waveform 41. A distinction is made between the slide door 2 for which the user performs opening or closing operation and a different slide door 2 and the different slide door 2 is prevented from malfunctioning.

Fifth Embodiment

A fifth embodiment of the invention will be discussed. The topics previously described with reference to FIGS. 1 to 4, namely, the structure of vibration detection device 10 and the like are similar to those of the first embodiment and the topics previously described with reference to FIG. 16, namely, a determination method of the waveform shape of an envelope W and the like are similar to those of the fourth embodiment and therefore will not be discussed again. In the fifth embodiment, a determination section 36 of a sensor circuit 12B determines whether or not the user performs opening or closing operation of a slide door 2 further from the number of times the increased and attenuated envelope W has appeared within a predetermined operation time period.

Figure 20:
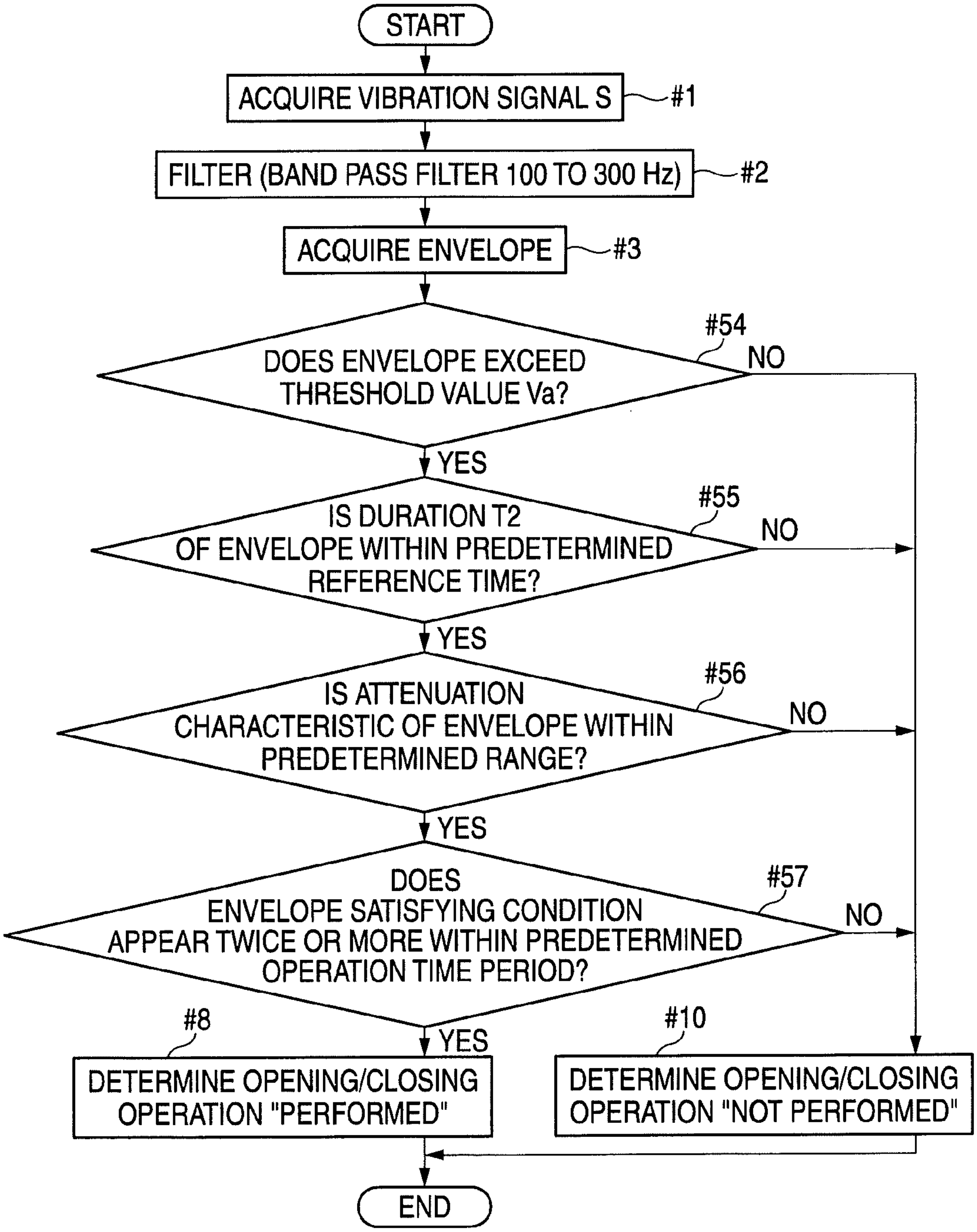
FIG. 20 is a flowchart to show an example of a processing procedure of a vehicle door opening-closing apparatus of a fifth embodiment of the invention.

FIG. 20 is a flowchart to show an example of a processing procedure of a vehicle door opening-closing apparatus of a fifth embodiment of the invention. As in the fourth embodiment, to begin with, the sensor circuit 12B acquires a vibration signal S generated by striking the vehicle from a piezoelectric sensor (vibration detection sensor) 11 (#1). Next, a filter section 31 of the sensor circuit 12B filters the sent vibration signal S to take out a signal of 100 to 300 Hz (#2). An envelope detection section 33 of the sensor circuit 12B acquires an envelope W from a vibration waveform 41 (#3).

Then, as in the fourth embodiment, the sensor circuit 12B executes steps #54 to #56 for determining whether or not the signal strength of the envelope W and the similarity of the shape feature of the envelope W are those produced as the user strikes the slide door 2 or a door handle 3. A minimum strength determination section 53 of the sensor circuit 12B determines whether or not the envelope W exceeds a third threshold value Va (#54). If the envelope W exceeds the third threshold value Va, a maximum strength determination section 54 finds a duration T4 until the envelope W attenuated through the peak after exceeding a predetermined first threshold value Vt returns to the first threshold value Vt. The maximum strength determination section 54 determines whether or not the duration T4 is within a predetermined reference time (#55). If the duration T4 is within the predetermined reference time, an attenuation characteristic determination section 55 determines whether or not the attenuation characteristic of the envelope W (gradient of attenuation approximate line) is within a predetermined range.

In the fifth embodiment, following step #56, the determination section 36 further determines whether or not the envelope W produced as the user strikes appears twice or more times (more than once) for a predetermined operation time period during which the user successively strikes the slide door 2 or the door handle 3 (#57). Preferably, the predetermined operation time period is about 0.5 to 1.0 s. For example, knocking about twice or three times as "rat-tat-tat" generally performed is a preferred embodiment of user's successive striking. The knocking about twice or three times is performed during the time period of about 0.5 to 1.0 s normally. Therefore, preferably the predetermined operation time period is set to about 0.5 to 1.0 s. A determination is thus made based on a plurality of envelopes W, whereby a higher-accuracy determination is made possible as compared with the case where a determination is made based on a single envelope W. For example, if the user gives vibration to the slide door 2 without intending to perform opening or closing operation (for example, if the body of the user touches the door), opening or closing the slide door 2 regardless of user's intention is suppressed.

If it is determined that the envelope W has appeared twice or more times for the predetermined operation time period, the determination section 36 determines that the envelope W is based on a vibration signal produced as the user performs opening or closing operation (#8). This means that the determination section 36 determines "opening/closing operation "performed"" and outputs the determination result to a door control section 18. Based on the determination result, the door control section 18 opens or closes the slide door 2 by assuming that the user intends to open or close the slide door 2 by striking.

If the predetermined condition is not satisfied at step #54, #55, #56, or #57, the determination section 36 determines "opening/closing operation "not performed"" (#10). The door control section 18 does not open or close the slide door 2 based on the determination result.

Preferably, if the envelope W appears three times or more within a predetermined operable time period (for example, 0.5 s) set shorter than the operation time period of 0.5 s to 1 s, the sensor circuit 12B determines that the user does not perform opening or closing operation for the slide door 2. Preferably, the determination processing is performed before step #8 following step #57. The user may knock more than once like "rat-tat-tat, . . . ," for example, as striking the door of the vehicle. However, usually the speed of striking that can be accomplished by a human being is limited. It is difficult for a general user to knock three times during 0.5 s. Therefore, when the envelope W appears three times or more within the predetermined operable time period, if the determination section 36 determines that the user does not perform opening or closing operation for the slide door 2, a precise determination is made possible.

Other Embodiments

In the description of the embodiments, the vehicle door opening-closing apparatus 1 is installed in the slide door 2, but the invention is not limited to the slide door 2 and can also be applied to a back door, a swing door, etc.

As discussed above, the present invention can provide at least the following illustrative, non-limiting embodiments.

(1) A vehicle door opening-closing apparatus for determining whether or not a user performs opening or closing operation for a vehicle door and opening or closing the vehicle door accordingly, the vehicle door opening-closing apparatus including: vibration detection means having a vibration detection sensor and a control circuit for detecting vibration caused by the opening or closing operation given to the vehicle door by the user, wherein the control circuit acquires an envelope formed by connecting crests or troughs of a vibration waveform provided by the vibration detection sensor, and determines whether or not the user performs the opening or closing operation of the vehicle door based on the shape of the envelope.

According to the vehicle door opening-closing apparatus in (1), vibration caused by the opening or closing operation given to the door by the user is detected and the door is opened or closed the door, so that good operability can be provided if both hands of the user are full. Whether or not the user performs the door opening or closing operation (for example, operation of striking the door) is determined from the envelope acquired from the vibration waveform from the vibration detection sensor. Therefore, the determination effect of noise of vibration at the running time, vibration caused by rain, hail, etc., or the like can be suppressed as compared with the case where whether or not door opening or closing operation is performed is determined from the vibration waveform. Whether or not the user performs the door opening or closing operation is determined from the shape of the envelope and the door is opened or closed accordingly. Therefore, a clear distinction is made between the door for which the user performs opening or closing operation and any other door and the possibility that a door for which the user does not perform opening or closing operation may be opened or closed can be suppressed. That is, vibration propagates through the vehicle main body, etc., to a door for which the user does not perform opening or closing operation, and thus the vibration differs in the shape of the envelope from vibration produced as the user performs direct door opening or closing operation. Therefore, a good distinction is made between the door for which the user performs opening or closing operation and any other door.

(2) The vehicle door opening-closing apparatus in (1) wherein the control circuit determines whether or not the user performs the opening or closing operation of the vehicle door based on the increase time until the envelope reaches a peak value from a predetermined threshold value; and the attenuation time for which the envelope attenuates from the peak value to the predetermined threshold value.

According to the vehicle door opening-closing apparatus in (2), the control circuit determines whether or not the user performs the opening or closing operation of the vehicle door from the increase time until the envelope reaches a peak value from a predetermined threshold value and the attenuation time for which the envelope attenuates from the peak value to the predetermined threshold value. Therefore, a distinction is made between the door for which the user performs opening or closing operation and any other door and the possibility that a door for which the user does not perform opening or closing operation may be opened or closed can be suppressed.

(3) The vehicle door opening-closing apparatus in (1) or (2) wherein the opening or closing operation given to the vehicle door by the user is successive striking the vehicle door or an opening/closing operation section provided on the vehicle door, and wherein the control circuit determines whether or not the user performs the opening or closing operation of the vehicle door based on the peak value of the envelope acquired at the first time, of the successively acquired envelopes and the shape of the envelope acquired at the second time or later.

According to the vehicle door opening-closing apparatus in (3), successive striking operation of the user, such as knocking, is general-purpose operation and is opening or closing operation easily understood and easily executed by a wide range of persons. For the successive striking, the control section determines whether or not the user performs the opening or closing operation of the vehicle door based on the peak value of the first envelope of the repeatedly acquired envelopes and the shape of the envelope acquired at the second time or later. Therefore, it is made possible for the control section to make a more precise determination.

(4) The vehicle door opening-closing apparatus in (3) wherein if the peak value of the envelope acquired at the first time exceeds a predetermined lower limit threshold value, the control circuit determines whether or not the user performs the opening or closing operation of the vehicle door based on the shape of the envelope acquired at the second time or later.

According to the vehicle door opening-closing apparatus in (4), whether or not the striking has a predetermined strength based on the peak value of the envelope acquired at the first time is determined. If the vibration detected at the first time is a predetermined strength or more, the control section makes an opening or closing operation determination based on the vibration detected at the second time or later. Therefore, the possibility that it may be determined that vibration produced by applying a comparatively weak force of a rain, etc., is opening or closing operation can be suppressed.

(5) The vehicle door opening-closing apparatus in (4) wherein if the peak value of the envelope acquired at the first time exceeds an upper limit value set to a larger value than the lower limit threshold value, the control circuit determines that the user does not perform opening or closing operation of the vehicle door regardless of the shape of the envelope acquired at the second time or later.

According to the vehicle door opening-closing apparatus in (5), whether or not the strength of striking is excessive is determined based on the peak value of the envelope acquired at the first time. If the vibration detected at the first time is a predetermined strength or less, the control section makes an opening or closing operation determination based on the vibration detected at the second time or later. Therefore, the possibility that it may be determined that vibration produced by applying a comparatively large force of a shock given by a person or an object to the vehicle independently of the opening or closing operation of the user, namely, a shock not intended by the user is opening or closing operation can be suppressed.

(6) The vehicle door opening-closing apparatus in (4) or (5) wherein the control circuit has an amplification section for amplifying output of the vibration detection sensor and acquires the envelope formed from the post-amplified vibration waveform, if the peak value of the envelope acquired at the first time exceeds the lower limit threshold value, sets an amplification factor of the amplification section to a factor at which the peak value of the envelope reaches a predetermined target peak value, and determines whether or not the user performs the opening or closing operation of the vehicle door based on the shape of the envelope formed from the vibration waveform after amplified using the setup amplification factor and acquired at the second time or later.

According to the vehicle door opening-closing apparatus in (6), the amplification factor for amplifying the output of the vibration detection sensor acquired at the second time or later is set based on the peak value of the envelope acquired at the first time. For example, successive striking operation of the user such as knocking is performed almost with the same strength. Therefore, the enveloped acquired after the output of the vibration detection sensor acquired at the second time or later is amplified becomes an envelope having a preferred value in the proximity of a predetermined target peak value as the peak value. Therefore, the control section can well determine whether or not the user performs opening or closing operation of the vehicle door based on the shape of the envelope at the second time or later. Preferably, the upper limit threshold value and the target peak value are the same value. If an external force for generating such a large vibration waveform with the peak value reaching the target peak value before amplification is applied, it can be well excluded and the peak value of the envelope after amplification can be made sufficiently large, so that the determination accuracy of the opening or closing operation improves.

(7) The vehicle door opening-closing apparatus in (1) wherein the control circuit determines whether or not the user performs the opening or closing operation of the vehicle door based on signal strength determined by the duration until the envelope attenuated through the peak after exceeding a predetermined first threshold value returns to the first threshold value and similarity determined by the shape feature of the envelope.

According to the vehicle door opening-closing apparatus in (7), whether or not the user performs the door opening or closing operation (for example, operation of striking the door) is determined from the feature of the envelope acquired from the vibration waveform from the vibration detection sensor, namely, the feature determined by the signal strength and the similarity of the shape feature. Therefore, the determination effect of noise of vibration at the running time, vibration caused by rain, hail, etc., or the like can be suppressed as compared with the case where whether or not door opening or closing operation is performed is determined from the vibration waveform. Vibration propagates through the vehicle main body, etc., to a door for which the user does not perform opening or closing operation, and thus the vibration differs in the feature of the envelope from vibration produced as the user performs direct door opening or closing operation. Therefore, a clear distinction is made between the door for which the user performs opening or closing operation and any other door and the possibility that a door for which the user does not perform opening or closing operation may be opened or closed can be suppressed.

(8) The vehicle door opening-closing apparatus in (7) wherein a predetermined second threshold value is set to the peak side of the envelope above the first threshold value, and wherein the control circuit determines the similarity based on the difference between the first and second threshold values; and the attenuation time for which the envelope attenuated through the peak attenuates from the second threshold value to the first threshold value.

If the magnitude of the vibration differs, the shape of the envelope also differs. However, the attenuation characteristic of the envelope attenuated through the peak becomes almost similar regardless of the magnitude of the vibration. According to the vehicle door opening-closing apparatus in (8), a comparison is made between the attenuation characteristic found based on the difference between the first and second threshold values and the attenuation time and the attenuation characteristic of the envelope acquired from the vibration waveform produced by standard opening or closing operation, whereby the envelope similarity can be well determined. The "time for which the envelope attenuated through the peak attenuates from the second threshold value to the first threshold value" contains the "time for which the envelope reaching the second threshold value in the peak attenuates from the second threshold value to the first threshold value."

(9) The vehicle door opening-closing apparatus in (7) or (8) wherein a predetermined third threshold value is set to the peak side of the envelope above the first threshold value, and wherein if the peak of the envelope reaches the third threshold value and the duration is within a predetermined reference time, the control circuit determines that the signal strength is within the allowable range.

If the signal strength is a predetermined minimum strength or more, the peak of the envelope reaches the third threshold value. If the signal strength is within a predetermined maximum strength, the duration of the sum of the envelope increasing time to the peak and the attenuating time from the peak falls within a predetermined reference time. Therefore, according to the vehicle door opening-closing apparatus in (9), the control circuit can well determine that the signal strength is within a predetermined range. The second and third threshold values may be set to the same value.

(10) The vehicle door opening-closing apparatus in any one of (1) to (9) wherein the control circuit determines whether or not the user performs the opening or closing operation of the door from the number of times the increased and attenuated envelope has appeared within a predetermined operation time period.

(11) The vehicle door opening-closing apparatus in (10) wherein when the envelope has appeared twice or more times within the operation time period, the control circuit determines that the user performs the opening or closing operation of the door.

(12) The vehicle door opening-closing apparatus in (10) or (11) wherein when the envelope has appeared three times or more within a predetermined operation time period shorter than the operation time period, the control circuit determines that the user does not perform opening or closing operation of the door.

According to the vehicle door opening-closing apparatus in (10), (11), or (12), the control circuit determines whether or not an occupant performs the door opening or closing operation from the number of times a rising and attenuated envelope has appeared within the predetermined time period. Therefore, if the user or any other person or an object gives vibration to the door without intending to perform opening or closing operation (for example, if the body touches the door), determining that opening or closing operation has been performed regardless of user's intention can be suppressed. Successive striking operation of the user, such as knocking, is generally the number of successive times of about two or three times. Therefore, if the envelope has appeared twice or more within the predetermined operation time period, preferably it is determined that the user performs opening or closing operation. Successive striking operation of the user such as knocking is not so high-speed operation. Therefore, the number of times the user can strike the door successively within the predetermined operation time period is limited. Then, the time period during which it is considered that the user cannot strike the door three successive times, for example, is set to an operable time period and when the envelope appears three times or more within the time period, if it is determined that the user does not perform opening or closing operation, the possibility that it may be determined that vibration that the user does not intend to produce is opening or closing operation can be suppressed.

What is claimed is:

1. A vehicle door opening-closing apparatus comprising:

a vibration detection sensor which detects vibration given to a vehicle door;

a control circuit which acquires an envelope formed by connecting crests or troughs of a waveform of the vibration detected by the vibration detection sensor, and which determines whether or not a shape of the envelope meets a condition; and a door control section which controls opening or closing of the vehicle door based on a result of determination by the control circuit, wherein the control circuit determines whether or not the shape of the envelope meets the condition based on similarity determined by a feature of the shape of the envelope.

2. The vehicle door opening-closing apparatus as claimed in claim 1, wherein the control circuit determines whether or not the shape of the envelop meets the condition based on:

an increase time until the envelope reaches a peak value from a threshold value; and an attenuation time until the envelope attenuates to the threshold value from the peak value.

3. The vehicle door opening-closing apparatus as claimed in claim 2, wherein the vibration is given to the vehicle door by successively striking the vehicle door or an opening/closing operation section on the vehicle door, and wherein the control circuit acquires the envelopes successively and determines whether or not the shape of the envelop meets the condition based on a peak value of the envelope acquired at a first time and the shape of the envelope acquired at a second time or later.

4. The vehicle door opening-closing apparatus as claimed in claim 3, wherein when the peak value of the envelope acquired at the first time exceeds a lower limit threshold value, the control circuit determines whether or not the shape of the envelope meets the condition based on the shape of the envelope acquired at the second time or later.

5. The vehicle door opening-closing apparatus as claimed in claim 4, wherein when the peak value of the envelope acquired at the first time exceeds an upper limit value larger than the lower limit threshold value, the control circuit determines that the shape of the envelop does not meet the condition regardless of the shape of the envelope acquired at the second time or later.

6. The vehicle door opening-closing apparatus as claimed in claim 4, wherein the control circuit includes an amplification section, and wherein:

when the peak value of the envelope acquired at the first time exceeds the lower limit threshold value, the amplification section amplifies the vibration waveform at an amplification factor at which the peak value of the envelope formed from the amplified vibration waveform reaches a predetermined target peak value, and the control circuit determines whether or not the shape of the envelope formed from the amplified vibration waveform and acquired at the second time or later meets the condition.

7. The vehicle door opening-closing apparatus as claimed in claim 1, wherein the vibration is given to the vehicle door by successively striking the vehicle door or an opening/closing operation section on the vehicle door, and wherein the control circuit acquires the envelopes successively and determines whether or not the shape of the envelop meets the condition based on a peak value of the envelope acquired at a first time and the shape of the envelope acquired at a second time or later.

8. The vehicle door opening-closing apparatus as claimed in claim 7, wherein when the peak value of the envelope acquired at the first time exceeds a lower limit threshold value, the control circuit determines whether or not the shape of the envelope meets the condition based on the shape of the envelope acquired at the second time or later.

9. The vehicle door opening-closing apparatus as claimed in claim 8, wherein when the peak value of the envelope acquired at the first time exceeds an upper limit value larger than the lower limit threshold value, the control circuit determines that the shape of the envelop does not meet the condition regardless of the shape of the envelope acquired at the second time or later.

10. The vehicle door opening-closing apparatus as claimed in claim 8, wherein the control circuit includes an amplification section, and wherein:

when the peak value of the envelope acquired at the first time exceeds the lower limit threshold value, the amplification section amplifies the vibration waveform at an amplification factor at which the peak value of the envelope formed from the amplified vibration waveform reaches a predetermined target peak value, and the control circuit determines whether or not the shape of the envelope formed from the amplified vibration waveform and acquired at the second time or later meets the condition.

11. The vehicle door opening-closing apparatus as claimed in claim 1, wherein the control circuit determines whether or not the shape of the envelope meets the condition based on signal strength determined by a duration lasting from a time point, at which the envelope increasing toward a peak exceeds a first threshold value, to a time point, at which the envelope attenuating from the peak returns to the first threshold value.

12. The vehicle door opening-closing apparatus as claimed in claim 11, wherein a second threshold value is set to be upper than the first threshold value, and wherein the control circuit determines the similarity based on a difference between the first and second threshold values; and an attenuation time lasting from a time point, at which the envelope attenuating from the peak reaches the second threshold value, to a time point, at which the envelope attenuating from the peak reaches the first threshold value.

13. The vehicle door opening-closing apparatus as claimed in claim 11, wherein a third threshold value is set to be upper than the first threshold value, and wherein when the peak of the envelope reaches the third threshold value and the duration is within a reference time, the control circuit determines that the signal strength is within an allowable range.

14. The vehicle door opening-closing apparatus as claimed in claim 11, wherein:

the control circuit counts a number of the envelopes, each having the shape meeting the condition, and determines whether or not the counted number of the envelopes during a first operation time is more than a predetermined number, and a door control section controls opening or closing of the vehicle door based on a result of determination by the control circuit.

15. The vehicle door opening-closing apparatus as claimed in claim 14, wherein when the control circuit determines that the counted number is more than 1, the door control section controls opening or closing of the vehicle door.

16. The vehicle door opening-closing apparatus as claimed in claim 14, wherein when the control circuit determines that the counted number of the envelopes during a second operation time period shorter than the first operation time period is more than 3, the door control section does not control opening of closing of the vehicle door.

17. The vehicle door opening-closing apparatus as claimed in claim 1, wherein:

the control circuit counts a number of the envelopes, each having the shape meeting the condition, and determines whether or not the counted number of the envelopes during a first operation time is more than a predetermined number, and a door control section controls opening or closing of the vehicle door based on a result of determination by the control circuit.

18. The vehicle door opening-closing apparatus as claimed in claim 17, wherein when the control circuit determines that the counted number is more than 1, the door control section controls opening or closing of the vehicle door.

19. The vehicle door opening-closing apparatus as claimed in claim 17, wherein when the control circuit determines that the counted number of the envelopes during a second operation time period shorter than the first operation time period is more than 3, the door control section does not control opening of closing of the vehicle door.

* * * * *